US012636977B2

(12) United States Patent
Alexandersson

(10) Patent No.: US 12,636,977 B2
(45) Date of Patent: May 26, 2026

(54) FOLDING AUTOMOTIVE SEAT

(71) Applicant: Volvo Car Corporation, Gothenburg (SE)

(72) Inventor: Peter Mikael Alexandersson, Kungsbacka (SE)

(73) Assignee: Volvo Car Corporation, Gothenburg (SE)

( * ) Notice: Subject to any disclaimer, the term of this patent is extended or adjusted under 35 U.S.C. 154(b) by 119 days.

(21) Appl. No.: 18/740,172

(22) Filed: Jun. 11, 2024

(65) Prior Publication Data

US 2025/0376085 A1 Dec. 11, 2025

(51) Int. Cl.
| *B60N 2/12* | (2006.01) |
| *B60N 2/02* | (2006.01) |
| *B60N 2/30* | (2006.01) |

(52) U.S. Cl.
CPC ............. *B60N 2/12* (2013.01); *B60N 2/0256* (2023.08); *B60N 2/3009* (2013.01); *B60N 2/0226* (2023.08)

(58) Field of Classification Search
CPC .......... B60N 2/12; B60N 2/0256; B60N 2/02; B60N 2/3009; B60N 2/30; B60N 2/0226
USPC .............. 297/216.1, 216.12, 216.15, 216.16, 297/216.17, 216.18, 216.19, 216.2, 217.1, 297/335, 378.1, 463.1
See application file for complete search history.

(56) References Cited

U.S. PATENT DOCUMENTS

| 8,585,145 B2 | 11/2013 | Nock et al. |
| 10,857,910 B2 | 12/2020 | Madhu |

| 11,752,911 B1 | 9/2023 | Ubale et al. | |
| 2006/0152058 A1* | 7/2006 | Pejathaya ............ | B60N 2/3065 297/378.12 |
| 2008/0224524 A1* | 9/2008 | Mather .................. | B60N 2/015 297/378.1 |
| 2013/0200668 A1* | 8/2013 | Michalak ................. | B60N 2/12 297/341 |
| 2018/0037140 A1 | 2/2018 | Gollhardt et al. | |

FOREIGN PATENT DOCUMENTS

| CN | 115431844 A | 12/2022 |
| CN | 111601732 B | 3/2023 |
| WO | 2023/223150 A1 | 11/2023 |

OTHER PUBLICATIONS

Extended European Search Report received for European Patent Application Serial No. 25172774.9 dated Oct. 17, 2025, 10 pages.

* cited by examiner

*Primary Examiner* — Justin V Lewis
(74) *Attorney, Agent, or Firm* — Amin, Turocy & Watson, LLP

(57) ABSTRACT

A configurable seat system with a collapsible seat cushion frame is described. The seat system can incorporate a kinematic structure at the seat cushion frame, such that the kinematic structure can be adjusted to cause the seat cushion to have a variable thickness/height. The adjustable seat enables convenient egress/ingress of a region of a passenger compartment and also convenient extension of a cargo bay area. One or more motors can be utilized to adjust respective position of respective components included in the seat system. Operation of the motors can be enabled in response to selection of a button, e.g., flat fold configuration, entry/ exit configuration, and such. Hence, an occupant of the vehicle only has to press a button to adjust the seat position with the one or more motors in conjunction with respective linkages/seat structure regardless of the mass of the seat system.

20 Claims, 14 Drawing Sheets

INITIAL CONFIGURATION
(SEAT FRAME 130 UNCOMPRESSED,
BACK REST 160 UPRIGHT,
HEAD REST 190 UPRIGHT.
SLIDERS 141A/B AT POSITION Pr)

INITIAL CONFIGURATION

100C

HEAD
REST
190

FLAT FOLD CONFIGURATION INITIATED
(SEAT FRAME 130 UNCOMPRESSED,
BACK REST 160 at x DEGREES,
HEAD REST 190 UPRIGHT.
SLIDERS 141A/B AT POSITION Pr)

SEAT
BACK
160

SEAT
FRAME
130

142A

UPPER
BASAL
PLANE
(BP2)

146A

148A

LOWER
BASAL
PLANE
(BP1)

150A 134-1

136-1

SEAT
BASE
110

138A

141A

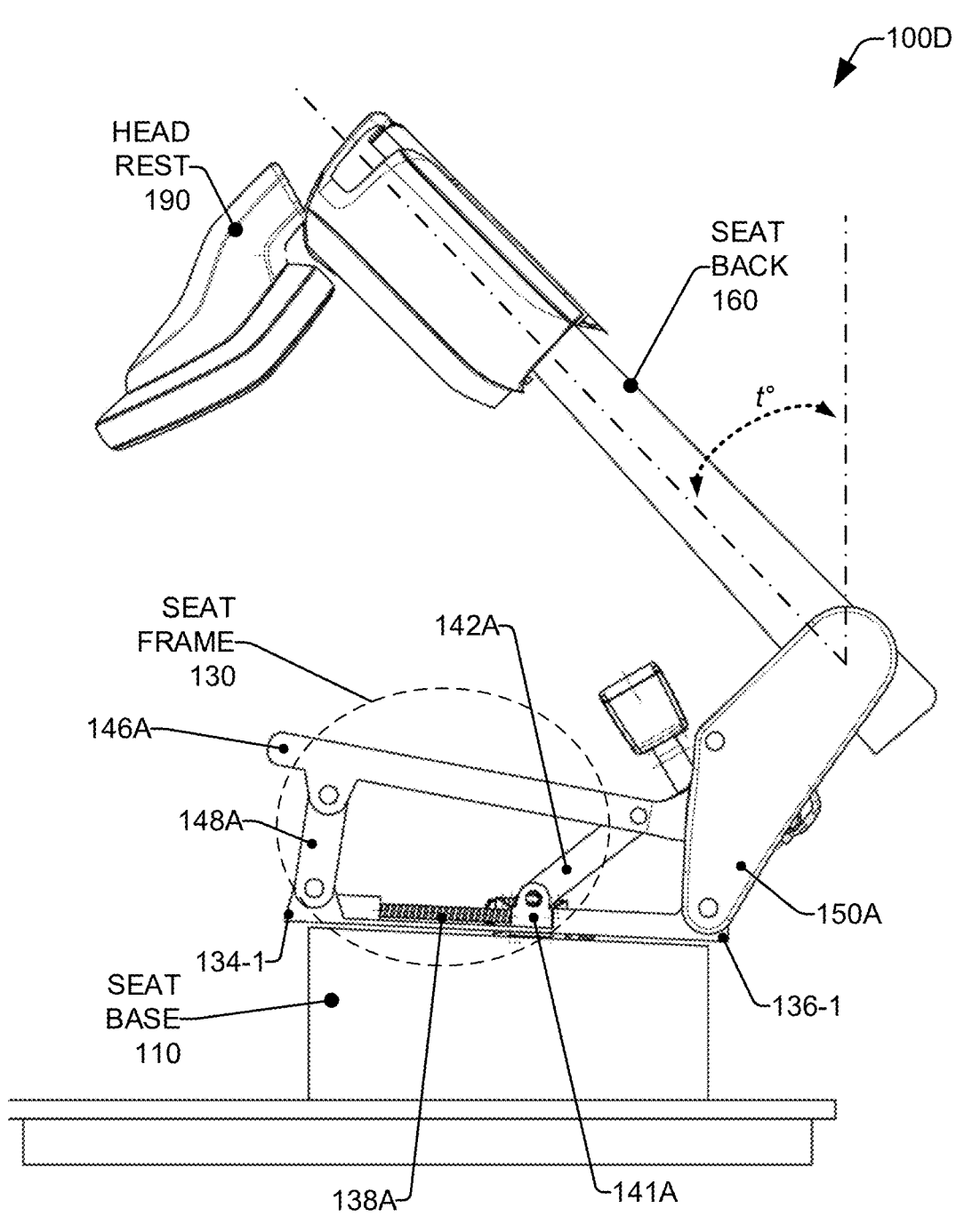
FIG. 1D     NEARING FINAL FLAT FOLD CONFIGURATION
(SEAT FRAME 130 UNCOMPRESSED, BACK
REST 160 67 DEGREES,
HEAD REST 190 FOLDED OVER.
SLIDERS 141A/B AT POSITION Pr)

100E

SEAT BACK
SURFACE 169

SEAT
BACK
FRAME
160

SEAT
BACK
FRAME
160

CARGO
BAY
FLOOR
198

HEAD
REST
190

142A

150A

146A

148A 134-1

Pf 136-1

SEAT
FRAME
130

141A       138A

Pr

FLAT FOLD CONFIGURATION
(SEAT FRAME 130 COMPRESSED,
BACK REST 160 FLAT,
HEAD REST 190 FOLDED OVER.
SLIDERS 141A/B AT POSITION Pf)

HEAD
REST
190

100F

EASY ENTRY CONFIGURATION
(SEAT FRAME 130 COMPRESSED
SEAT BACK 160 TILTED
HEAD REST 190 UPRIGHT.
SLIDERS 141A/B AT POSITION Pf)

SEAT
BACK
160

SEAT
FRAME
130

142A

146A

150A

148A 134-1

SEAT
BASE
110

136-1

141A

138A

Q1
INITIAL
POSITION

Q2
MID-POINT

Q3
ENTRY POSITION/
FOLD FLAT POSITION

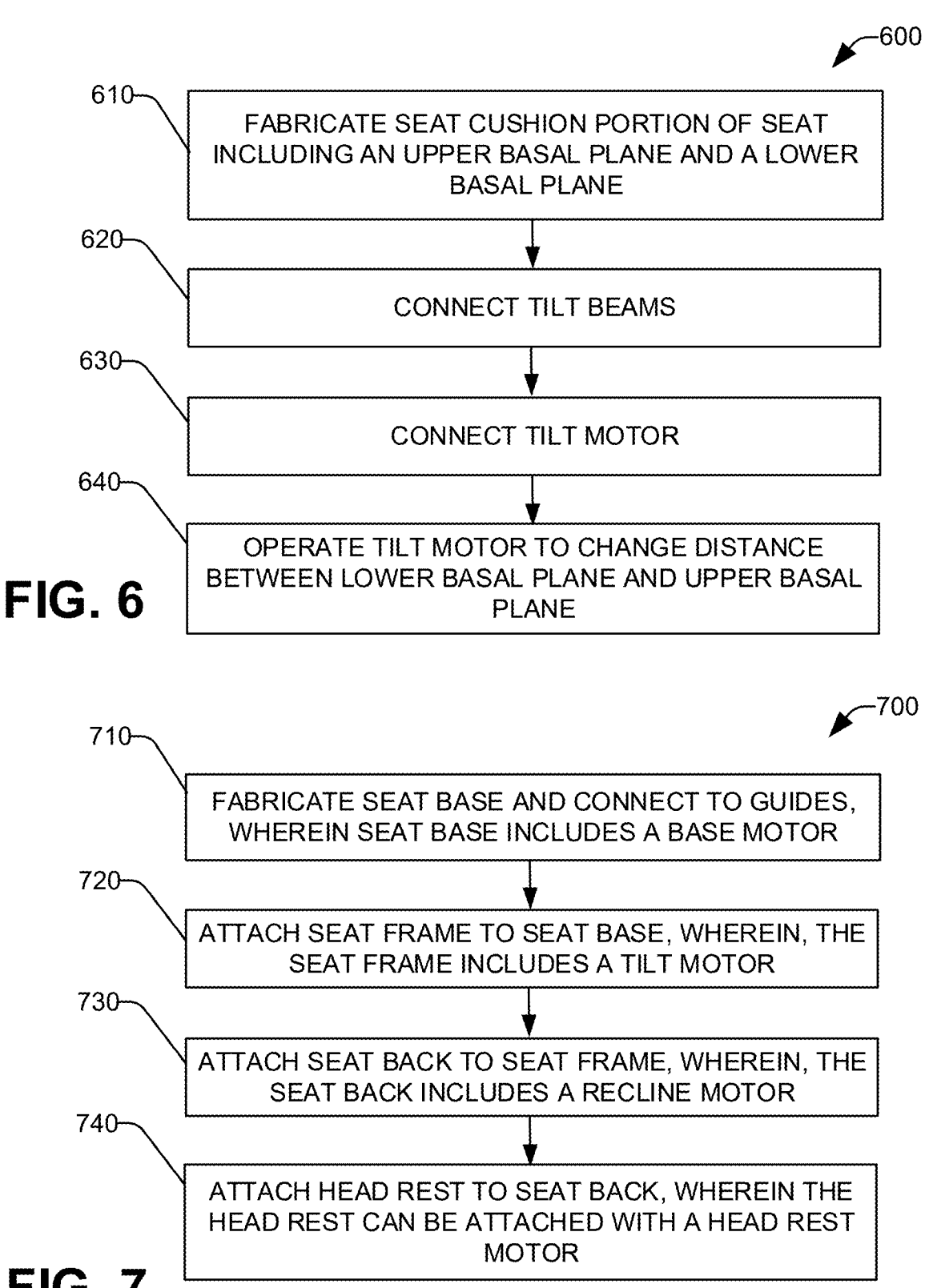

600

610 — FABRICATE SEAT CUSHION PORTION OF SEAT INCLUDING AN UPPER BASAL PLANE AND A LOWER BASAL PLANE

620 — CONNECT TILT BEAMS

630 — CONNECT TILT MOTOR

640 — OPERATE TILT MOTOR TO CHANGE DISTANCE BETWEEN LOWER BASAL PLANE AND UPPER BASAL PLANE

710 — FABRICATE SEAT BASE AND CONNECT TO GUIDES, WHEREIN SEAT BASE INCLUDES A BASE MOTOR

720 — ATTACH SEAT FRAME TO SEAT BASE, WHEREIN, THE SEAT FRAME INCLUDES A TILT MOTOR

730 — ATTACH SEAT BACK TO SEAT FRAME, WHEREIN, THE SEAT BACK INCLUDES A RECLINE MOTOR

740 — ATTACH HEAD REST TO SEAT BACK, WHEREIN THE HEAD REST CAN BE ATTACHED WITH A HEAD REST MOTOR

HEAD REST 190

SEAT BUCKLE 196

BACK FRAME 160

SEAT FRAME 130

Pf

Pr

SEAT BASE 110

BACK FRAME 160

900B

HEAD REST 190

SEAT FRAME 130

Pf

Pr

SEAT BASE 110

FOLDING AUTOMOTIVE SEAT

TECHNICAL FIELD

This application relates to an adjustable vehicle seat having a collapsible seat frame.

BACKGROUND

Sports utility vehicles, station wagons, and suchlike, offer versatility regarding transporting passengers and also equipment/goods. Depending upon the number and location of seats, hatchback, etc., one or more seats may be placed in a number of positions/configurations. For example, to enable egress/ingress of passengers, a seat back can be tilted, and further, the seat can be slid forward/back. In another example, to enable loading of a cargo area of a vehicle, the seat backs can be folded flat. Enabling easy positioning of the seat with regard to vehicle entry/dismount, cargo loading, etc., improves the driver/passenger experience.

SUMMARY

The following presents a summary to provide a basic understanding of one or more embodiments described herein. This summary is not intended to identify key or critical elements, or delineate any scope of the different embodiments and/or any scope of the claims. The sole purpose of the Summary is to present some concepts in a simplified form as a prelude to the more detailed description presented herein.

In one or more embodiments described herein, systems, methods, apparatus and/or computer program products are presented regarding a seat system having an adjustable seat frame.

As further described, the seat system includes a configurable seat frame having a height that can be adjusted to enable the seat back to be tilted forward to a flat profile. The one or more embodiments described herein present an adjustable seat, comprising a first set of components arranged in a first plane located in a seat frame and a second set of components arranged in a second plane located in the seat frame, wherein the second plane is parallel, or substantially parallel, to the first plane, and the second plane is separated from the first plane by a first separation distance. In a further embodiment, the adjustable seat further comprises a tilt beam connecting the first set of components to the second set of components and a tilt motor connected to the tilt beam, wherein operation of the tilt motor causes the tilt beam to change position, wherein a change in position of the tilt beam results in the second plane being separated from the first plane by a second separation distance. In an embodiment, the second separation distance is less than the first separation distance.

In a further embodiment, the adjustable seat further comprises the seat frame connected to a reclinable back rest. Further, the seat is attached to a floor, and with the seat having the second separation distance, the back rest is reclined to a position such that the back rest is substantially parallel to the floor.

In another embodiment, the adjustable seat further comprises (i) a positioning rod having a grooved surface, wherein the positioning rod is included in the first set of components, (ii) a positioning gear configured to mesh with the grooved surface, (iii) a movable slider configured to house the positioning gear, and (iv) a drive shaft connecting the tilt motor to the gear.

In a further embodiment, a first end of the tilt beam connects with the first set of components, connection is via a first joint, and a second end of the tilt beam connects with the second set of components, connection is via a second joint. In another embodiment, movement of the tilt beam in a first direction along the positioning rod causes a reduction in the separation distance between the first plane and the second plane, and movement of the tilt beam in a second direction along the positioning rod causes an increase in the separation distance between the first plane and the second plane.

In a further embodiment, the adjustable seat further comprises a pair of front linkages connecting the first set of components to the second set of components, and a pair of rear linkages connecting the first set of components to the second set of components, wherein the pair of front linkages and pair of rear linkages constrain movement of the first plane relative to the second plane in the x and y axes. In an embodiment, the tilt beam is located between a first front linkage in the pair of front linkages and a first rear linkage in the pair of rear linkages.

In another embodiment, the first set of components comprise a front beam, a rear beam, a pair of positioning rods, and the second set of components comprise a first frame bar, a second frame bar, and a pair of cushion subframes.

In an embodiment, the adjustable seat is located onboard a vehicle.

In other embodiments, elements described in connection with the disclosed systems can be embodied in different forms such as a method. For example, in an embodiment, a method can be utilized to construct and operate an adjustable seat, wherein the method comprises operating a tilt motor to move a geared slider in a first direction along a grooved rod, wherein the geared slider is connected to a first end of a tilt beam, the second end of the tilt beam is connected to a subframe, wherein the grooved rod is included in a first set of components located in a seat structure defined by a first basal plane and the subframe is included in a second set of components located in the seat structure defined by a second basal plane, wherein the first basal plane and the second basal plane are parallel, or substantially parallel, and wherein, motion of the geared slider in a first direction along the grooved rod causes a separation distance between the first basal plane and the second basal plane to decrease.

In a further embodiment, the seat structure can be located onboard a vehicle and operation of the tilt motor can be initiated in response to selection of a button located onboard the vehicle.

In another embodiment, the geared slider, the first set of components, and the second set of components form a kinematic lattice, wherein motion of the kinematic lattice is confined to the lateral and vertical directions.

In a further embodiment, a back rest can be attached to the kinematic lattice, with the slider moving in the first direction, the back rest is tilted by a recline motor, such that the back rest is rotated to a flat fold position. Further, the back rest includes a back surface, and when the back rest is in the flat fold position, the back surface is aligned with a surface of a cargo back located onboard the vehicle.

In another embodiment, a head rest can be attached to the back rest, and when the back rest is in the flat fold position, the head rest is aligned vertically with respect to a horizontal alignment of the back rest.

In a further embodiment, re-selection of the button causes the tilt motor to reverse direction, returning the first set of components located to an initial position relative to the position of the second set of components located in the seat structure.

According to further embodiments, a seat system is provided that comprises a seat cushion frame comprising (i) a kinematic structure, wherein the kinematic structure is located between and connects a seat base to a seat back, the seat cushion frame comprises a first set of components forming a lower basal plane and a second set of components forming an upper basal plane, wherein the lower basal plane and the upper basal plane are parallel, or substantially parallel, (ii) a first tilt beam configured to connect the lower basal plane with the upper basal plane, and (iii) a tilt motor configured to adjust position of the first tilt beam from a first position to a second position, wherein the first position of the first tilt beam creates a first separation distance between the upper basal plane and the lower basal plane, and the second position of the first tilt beam creates a second separation distance between the upper basal plane and the lower basal plane, wherein the first separation distance is greater than the second separation distance.

In another embodiment of the seat system, the seat system can further comprise a second tilt beam paired with the first tilt beam, wherein the second tilt beam is configured to connect the lower basal plane with the upper basal plane and operate in parallel with the first tilt beam. In a further embodiment, the tilt motor is configured to adjust position of the second tilt beam from a third position to a fourth position, wherein the third position of the second tilt beam is aligned parallel to an alignment of the first tilt beam when in the first position, and the fourth position of the second tilt beam is aligned parallel to an alignment of the first tilt beam when in the second position.

DESCRIPTION OF THE DRAWINGS

One or more embodiments are described below in the Detailed Description section with reference to the following drawings.

FIGS. 1A-1F present various illustrations of an adjustable seat which can be placed in various configurations/positions to enable access of a vehicle and/or cargo storage, in accordance with one or more embodiments.

FIG. 6 is a flow diagram presenting a method for constructing and utilizing a seat, in accordance with one or more embodiments.

FIG. 7 is a flowchart presenting a method for constructing and utilizing a seat, in accordance with one or more embodiments.

DETAILED DESCRIPTION

Figure 1A:
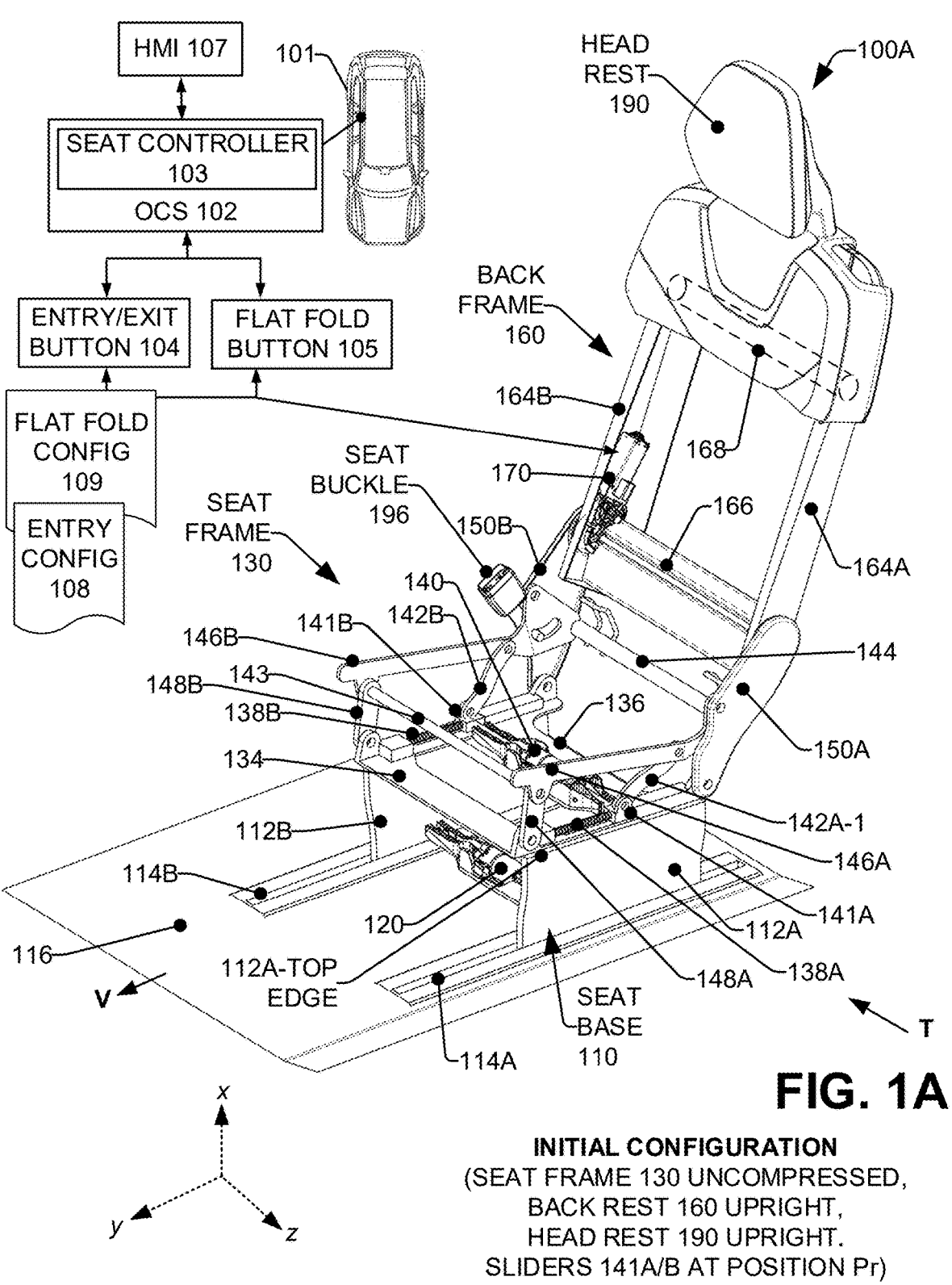

The following detailed description is merely illustrative and is not intended to limit embodiments and/or application or uses of embodiments. Furthermore, there is no intention to be bound by any expressed and/or implied information presented in any of the preceding Background section, Summary section, Abstract section, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling. Likewise, it is to be understood that when an element is referred to as being "connected" to another element, it can describe one or more different types of connecting including, but not limited to, electrical connecting, electromagnetic connecting, operative connecting, optical connecting, physical connecting, thermal connecting, and/or another type of connecting. Further, ranges A-n are utilized herein to indicate a respective plurality of devices, components, signals etc., where n is any positive integer.

The various embodiments presented herein disclose various operations and positions a seat can undergo to enable activities such as ingress/egress of a vehicle, loading of a cargo area of a vehicle, and suchlike. In an example scenario of application, serviceable area of a cargo bay/trunk/boot of a vehicle can be extended/increased by folding down/lowering one or more seats. In another example scenario of application, where a first seat is located in front of another row of seats (e.g., rear seats), the first seat can be temporarily moved forward, and further, the back rest tilted forward, to enable a passenger to access/exit the rear seat(s). While adjustment of the seat, to enable loading/passenger access, can be achieved based on human/manual operation of respective levers, tilt mechanisms, etc., the physical weight of the seat may be of concern. Accordingly, as further described in the respective embodiments, a series of motors/motion devices can be utilized to position/re-position a seat, e.g., based on a desired operation, such as flat folding the seat to extend a cargo bay, tilting the seat to enable passenger entry/exit, and the like.

During positioning of the seat in either of the flat fold positions or entry/exit positions, the seat cushion portion of the seat can undergo/be compressed to enable tilting/rotation of the seat back rest with a degree of rotation that is not possible with a conventional seat system. For example, by enabling the seat cushion portion of the seat to be narrower/flatter/compressed than a regular seat cushion portion that does not undergo such change in size/dimension, a greater degree of freedom of rotation/incline of the back rest is enabled, which, per the flat fold configuration, enables a back/rear surface of the back rest to be in the same flat plane as a floor of a cargo bay adjacent to the seat, for example.

In an example configuration of use, a series of seats having the design/configuration disclosed herein, can be positioned such that a seat forms the third seat and/or the second seat, such that the third seat is adjacent to the cargo bay and folds flat while the second seat is in front of the third seat and can fold flat to extend the cargo bay further, and also can be placed in the entry/exit position to enable access to the third seat positioned behind the second seat.

It is to be appreciated that while the various embodiments presented herein are presented with regard to a seat being utilized on board a vehicle, the presented embodiments are not so limited and can be applied to any situation where one or more seats can be utilized to extend/expand a cargo space/area/bay as well as tiltable to enable access of a seat/area/location behind the tiltable seat. Further, applications are not limited to civilian/personal use, but can be utilized in any vehicle/system such as military equipment, marine equipment, railroad equipment, aviation equipment, manned spaceflight, and the like.

Various benefits are provided by the seat system presented herein in the various embodiments, enabling convenient/ easy egress/ingress of a region of a vehicle (e.g., row of seats behind the configurable seat presented in the embodiments presented herein), convenient extension of a cargo area and return to seated arrangement, and suchlike. Further, by utilizing one or more motors in conjunction with respective linkages/seat structure, deployment of a seat to a desired configuration can be achieved by selection of a button press. Accordingly, a person only requires the physical ability to select/press a button to activate the one or more motors, while the various embodiments presented herein enable automated positioning of the seat, even with the inherent weight/mass and bulk/awkwardness of a seat.

It is to be appreciated that the terms "support", "beam", "rod", "bar", "shaft", "strut", "member", etc., can be used interchangeably.

1. Configurable Seat Structure

Figure 1B:
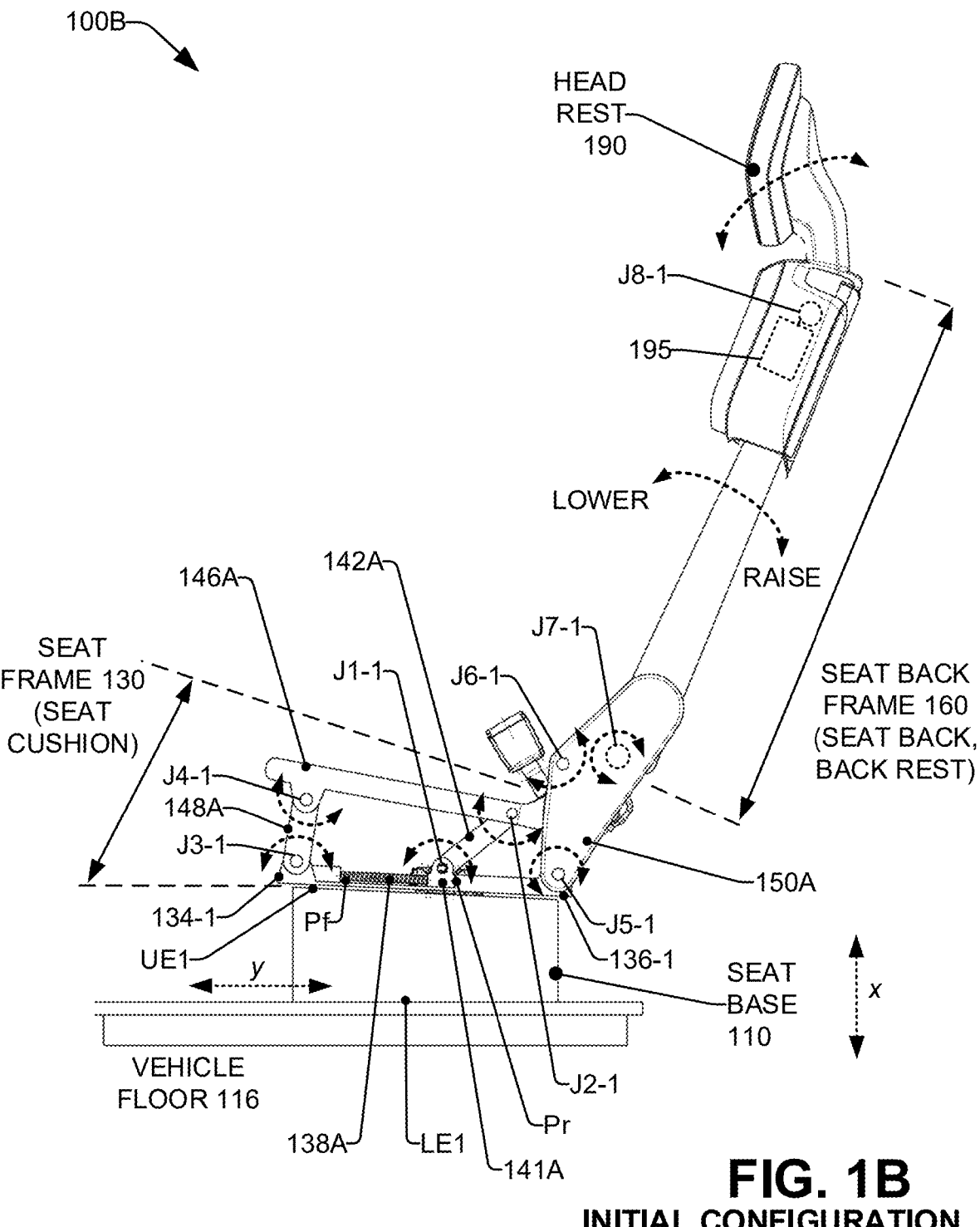
Figure 1C:
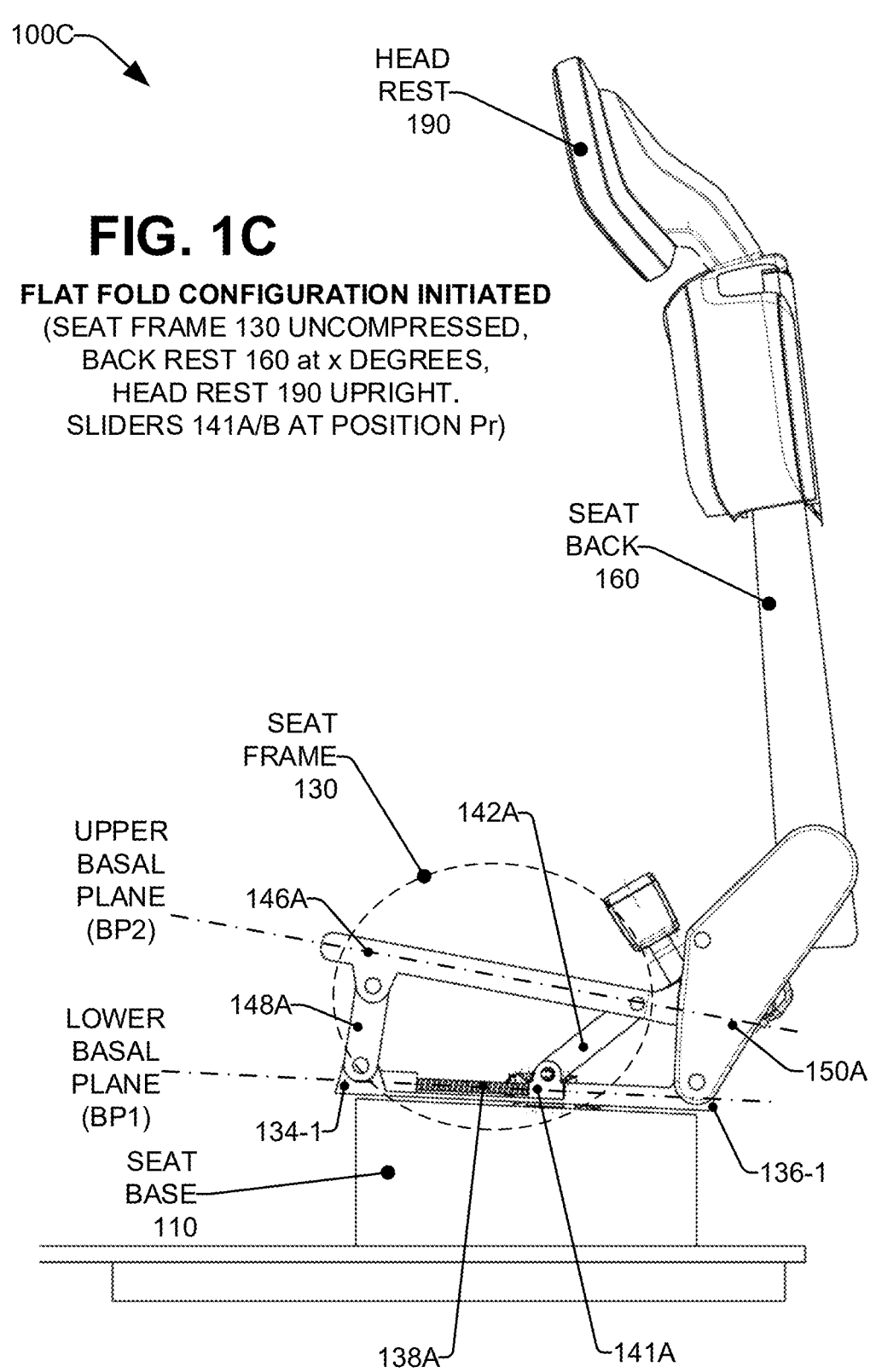
Figure 1E:
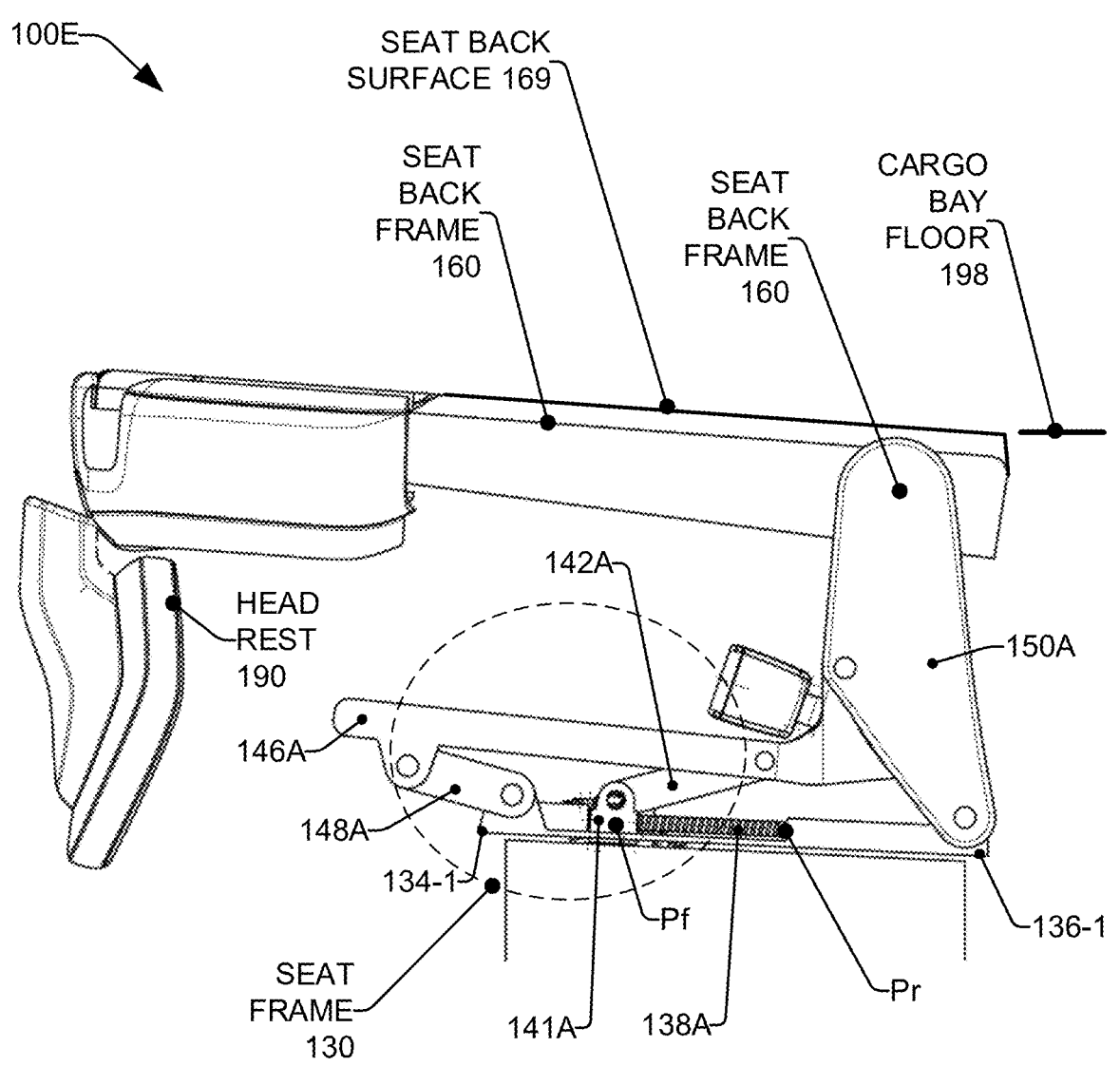
Figure 1F:
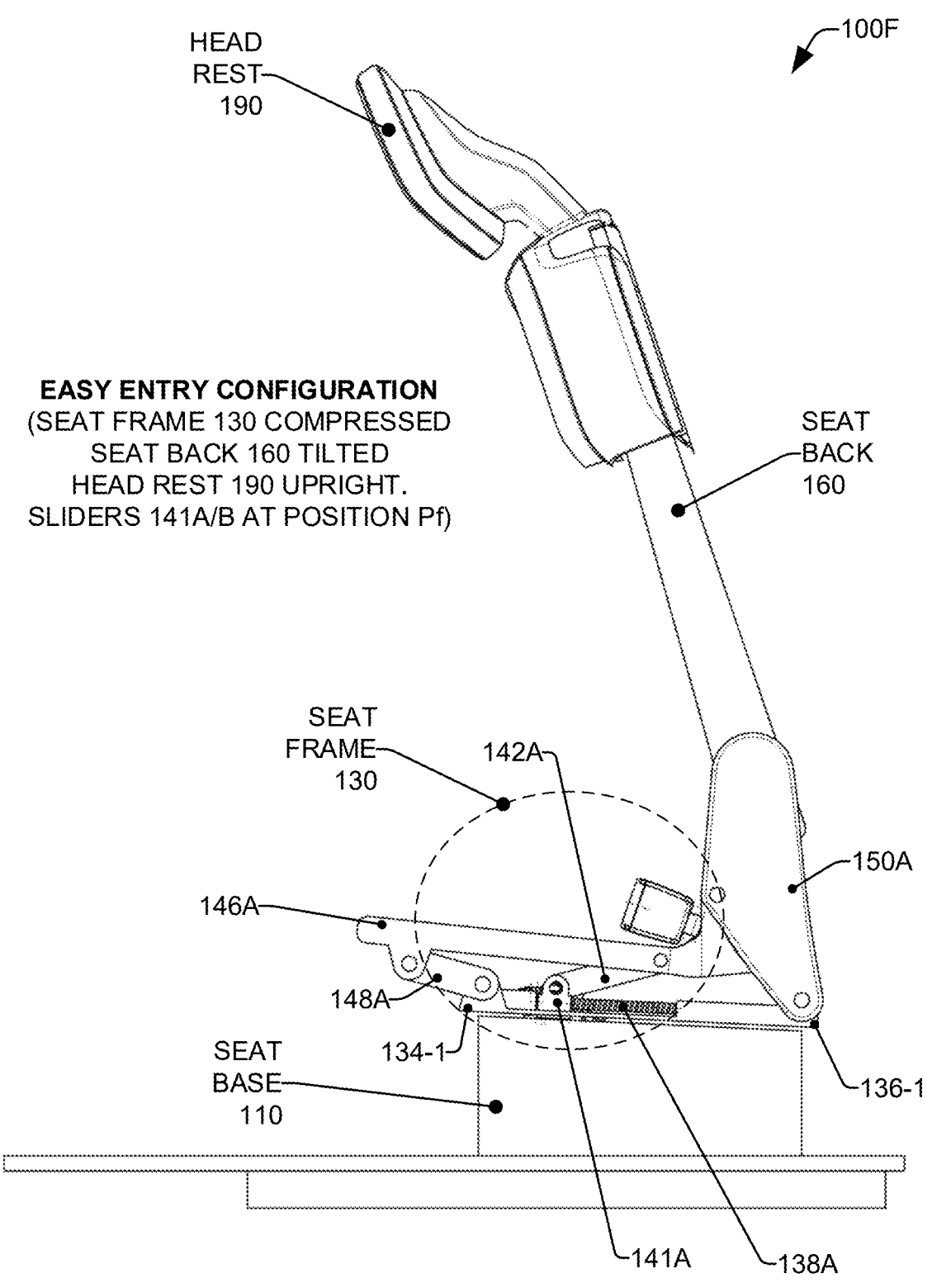

Turning now to the drawings, FIGS. 1A-IF present various illustrations of a movable seat 100A-F that can be placed in various configurations/positions to enable access of a vehicle and/or cargo storage, in accordance with one or more embodiments. FIGS. 1A-1F present component assembly drawings from various viewpoints. FIG. 1A is a component assembly drawing identifying the respective portions of a seat 100 when positioned in an initial configuration, FIG. 1B is an assembly drawing in direction T of seat 100 in the initial configuration, FIG. 1C is an assembly drawing in direction T of seat 100 in an early stage of being placed in the flat fold configuration, FIG. 1D is an assembly drawing in direction T of seat 100 in an intermediate stage of being placed in the flat fold configuration, FIG. 1E is an assembly drawing in direction T of seat 100 in a final flat fold configuration, FIG. 1F is an assembly drawing in direction T of seat 100 in an easy entry/easy exit configuration.

Figures 2A, 2B, 2C:
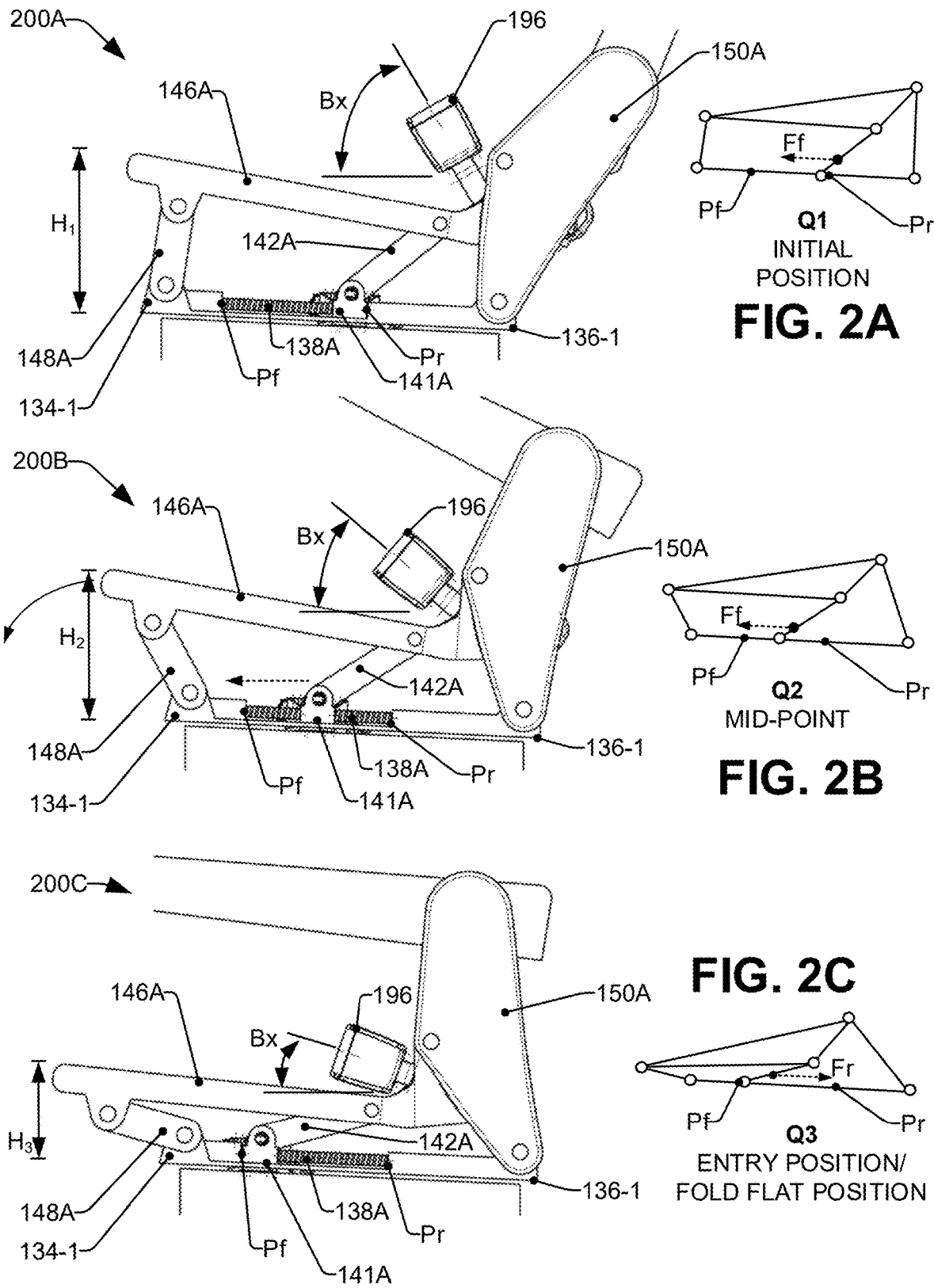
FIGS. 2A-C illustrate a reduction in the thickness/height of a seat frame being achieved, per the various embodiments presented herein.

FIGS. 1A-F can be read in conjunction with FIGS. 2A-C, wherein FIGS. 2A-C illustrate a reduction in the thickness/ height of the seat frame 130 being achieved, per the various embodiments presented herein.

Figures 3A, 3B, 3C:
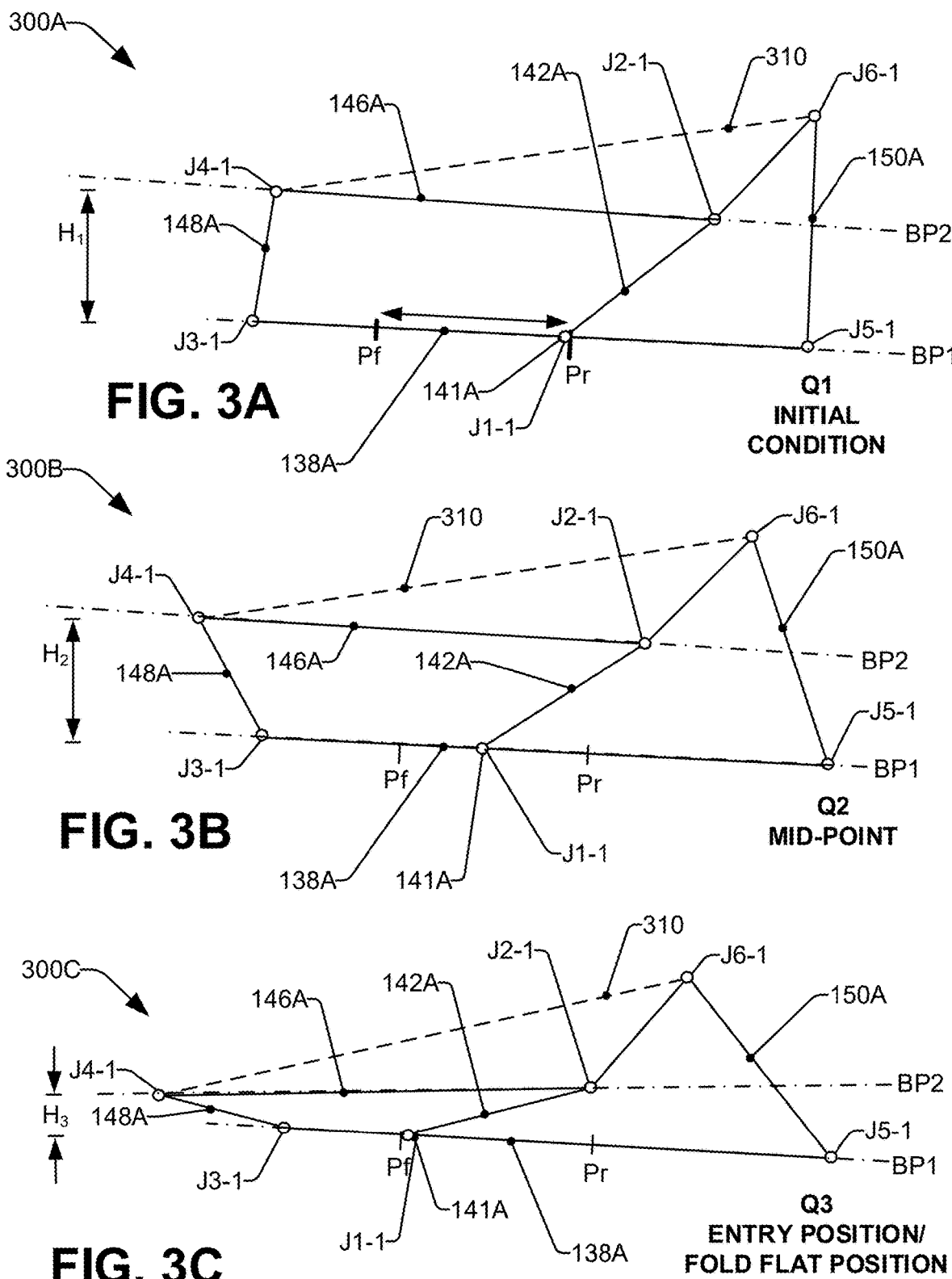
FIGS. 3A-C illustrate respective wire frame diagrams illustrating respective positions of components, joints, and applied forces in adjusting a seat frame, per the various embodiments presented herein.

FIGS. 2A-C can be read in conjunction with FIGS. 3A-C, wherein FIGS. 3A-C illustrate respective wire frame diagrams/mathematical models illustrating respective positions of components, joints, and applied forces, per the various embodiments presented herein.

Owing to the various pairs of beams, brackets, linkages, rods, joints, etc., utilized to construct seat system 100, a reference number convention of a single number plus alternatives indicating duplicate/paired common components is utilized herein. For example, per FIG. 1A, components presented on a first side are paired/duplicated by corresponding components on a second side, such as, when viewed in direction V, direction of motion of the vehicle, a first position slider 141A is presented on the left hand side of seat 100 and a second position slider 141B is presented on the right hand side of seat 100. Accordingly, description of operation, location, construction, etc., of the first position slider 141A also corresponds to second position slider 141B. Further, various joints Jx-x are presented with such notation indicating both location of a joint, bearing, etc., connecting respective components as well as the notation being utilized herein to indicate an end of a respective component. For example, joint J1-1 is the first joint in a pair of joints J1-1 and J1-2, and further, the notation J1-1 indicates the respective end of the first position slider 141A connected to the first end J1-1 of the first tilt beam 142A located on the left hand side of seat frame 130, while notation J1-2 indicates the respective end of the second position slider 141B connected to the first end J1-2 of the second tilt beam 142B on the located right hand side of seat frame 130.

As shown in FIG. 1A, seat 100 can be considered to comprise of four portions, wherein each portion comprises a three dimensional/3D structure/configuration having edges, sides, vertices/corners, various joints/pivot points, and such, combining to create a 3-D kinematic structure. Seat 100 can be located onboard a vehicle 101. The 3D structures are substantially cuboidal in nature, respectively being a quadrilateral-faced hexahedron/six-faced polyhedron. The four portions combine to form the seat 100, and comprise a seat base 110 (e.g., including a seat raiser), a seat frame 130 (aka a seat cushion frame), a seat back frame 160, and a headrest 190.

As further described, a series of beams, connectors, etc., form and connect the respective portions together, and are further configured to pivot/rotate about various joints Jx-x acting as pivot points Px-x. As further described, respective positioning of the four portions of seat 100 can be controlled by respective motors (e.g., base motor 120, tilt motor 140, recliner motor 170, head rest motor 195, and such), wherein operation of the motors can be controlled by respective selection/operation of a first button, entry/exit button 104 (hereinafter entry button 104), or a second button, flat fold button 105, per the desired positioning of seat 100. Entry button 104 and flat fold button 105 are electrically coupled/ connected to a seat controller component (SCC) 103. In an embodiment, SCC 103 can be a standalone device. In another embodiment, SCC 103 can be incorporated into an onboard computer system (OCS) 102 located onboard vehicle 101, wherein, OCS 102 (e.g., comprising a processor, memory, etc.) can be a vehicle control unit (VCU), for example, as utilized to control/monitor operation of vehicle 101, wherein vehicle 101 can be an autonomous vehicle (AV), a semi-autonomous vehicle, and suchlike. SCC 103 can be electrically coupled to the various motors and position sensors located in motors/onboard vehicle 101.

The seat base 110 forms a lower portion and is located on/attached to a floor/base/floorpan 116 of an interior (e.g., passenger compartment) of vehicle 101, whereby the seat frame 130 is attached to/sits above the seat base 110. Lateral motion of the seat base 110 (e.g., by base motor 120) in a horizontal/y-plane direction also causes the seat frame 130 to move in a similar, lateral manner. As further described, the thickness/height of the seat frame 130 can be adjusted in accordance with the configuration of seat 100. When in an "initial" use configuration (e.g., initial position per FIGS. 1A and 1B), the seat back frame 160 is aligned/extends in a substantially vertical/x-plane direction wherein, as further described (e.g., per FIGS. 1C-E), the seat back frame 160 can be further positioned/rotated relative to the seat frame 130, such that the seat back frame 160 lies flat on the seat frame 130, or the seat back frame 160 is positioned to enable entry/exit of vehicle 101 (e.g., per FIGS. 1A and 1F). Head rest 190 can be located on the uppermost end of the seat back frame 160, whereby, the head rest 190 can be tilted relative to the angle of inclination of the seat back frame 160 (e.g., per FIGS. 1A-1F).

Seat base 110 can comprise of a pair of base sides 112A and 112B, wherein a lower edge/end LE1 and LE2 of the base sides 112A and 112B are located in/positionally guided by respective guide rails/floor rails 114A and 114B located in floor 116. Position of the seat base 110 (and accordingly of seat 100) can be controlled by a base motor 120, wherein motion of the motor 120 causes positional/lateral motion of the seat base 110, and seat 100, in the ±y direction.

Seat frame 130 is located above the seat base 110 and comprises a front beam 134 and a rear beam 136, wherein the front beam 134 is fixably attached to a first upper portion, UE1, of the base sides 112A and 112B, and further, the rear beam 136 is fixably attached to a second upper portion, UE2, of the base sides 112A and 112B (e.g., per FIG. 1A, side 112A-top edge).

A pair of positioning rods 138A and 138B respectively connect to the front beam 134 and the rear beam 136 (e.g., on the left side of seat 100 at first end 134-1 of front beam 134, at J3-1, and first end 136-1 of rear beam 136, at J5-1, and also at, on the right side of seat 100 at a second end 134-2 of front beam 134, at J3-2 and a second end 136-1 of rear beam 136, at J5-2). In an embodiment, positioning rods 138A and 138B are threaded/grooved (e.g., along a motion control portion between positions Pf and Pr), enabling a gear/nut 139A and 139B (not shown) to be moved back and forth along the respective positioning rod 138A/B. Positioning rods 138A and 138B can be threaded for a portion of their respective lengths, wherein the length portions coincide with positions Pf and Pr.

Figures 5A, 5B:
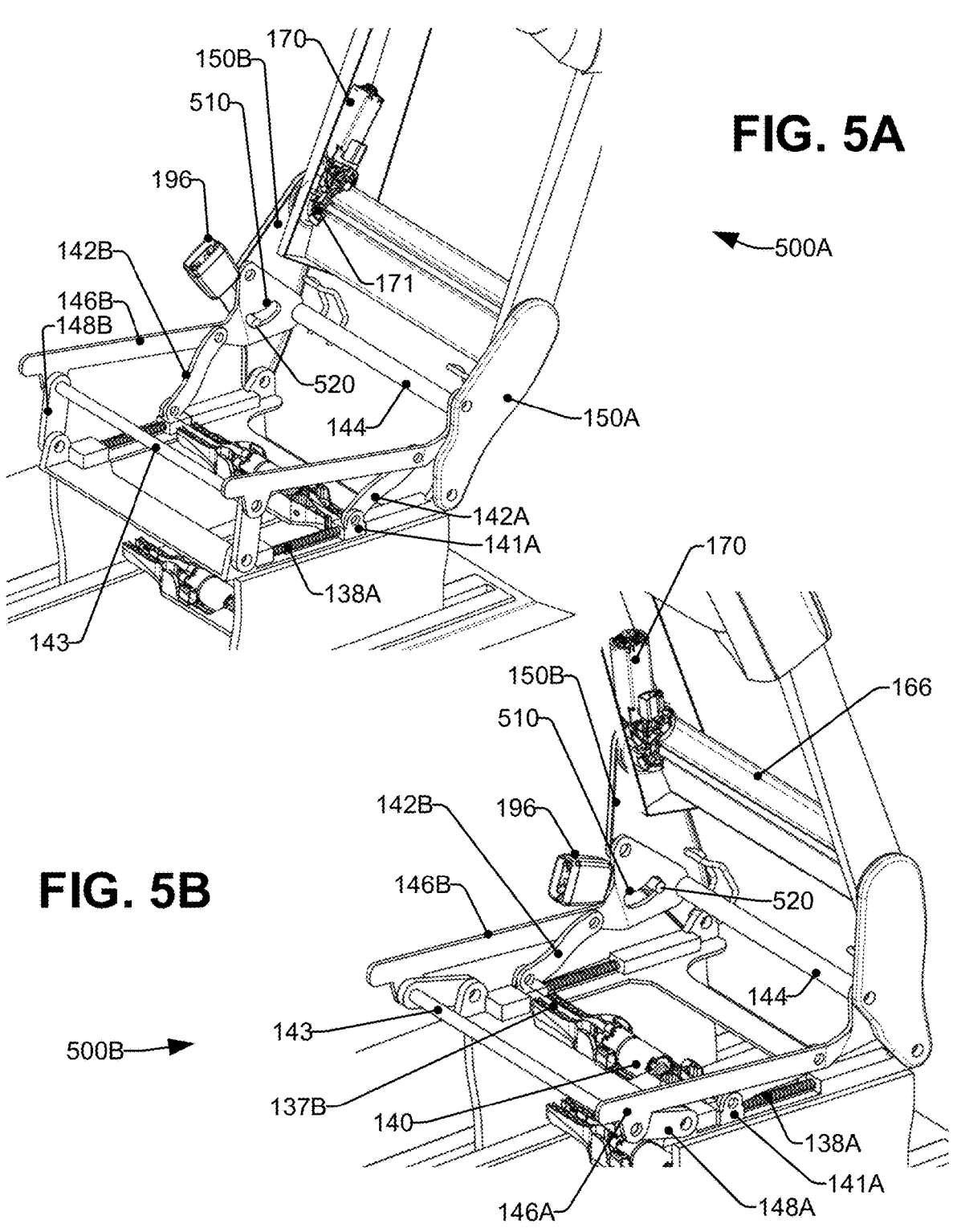
FIGS. 5A and 5B illustrate location of a seatbelt buckle during collapsing/reclining of a seat, in accordance with one or more embodiments.

Movement of the gear 139A/B along the rod 138A/B is provided by a tilt motor 140 connected to the gear 139A/B (e.g., via drive bars/shafts 137A and 137B, per FIG. 5B). The respective gear/nut 139A and 139B can be located/housed in a position slider 141A and 141B. The position sliders 141A and 141B can also be connected to tilt beams 142A and 142B, wherein a first end 142A-1 of tilt beam 142A connects to position slider 141A (e.g., at joint J1-1) and a first end 142B-1 of tilt beam 142B connects to position slider 141B (e.g. J1-2).

Located above the front beam 134 is a front frame bar 143 and above rear beam 136 is a rear frame bar 144. Located above the first base side 112A is a first cushion subframe 146A and located above the second base side 112B is a second cushion subframe 146B. A pair of front linkages 148A and 148B respectively connect the first end 134-1 of the front beam 134 to a front end of cushion subframe 146A-1, and further, the second end 134-2 of the front beam 134 to a front end of cushion subframe 146B-1. As further described, movement of the position sliders 141A and 141B along the respective positioning rods 138A and 138B generates a force at tilt beams 142A and 142B, e.g., forward force, $F_f$, or rearward force, $F_r$, which acts upon the respective components in the seat frame 130.

In an embodiment, a pair of recliner brackets 150A and 150B are configured to respectively connect a first end 136-1 of the rear beam 136 to rear end J6-1 of first cushion subframe 146A-1, and further, a second end 136-2 of the rear beam 136 to rear end J6-2 of second cushion subframe 146B-1.

A second end J7-1 and J7-2 of the pair of recliner brackets 150A and 150B are configured to connect the seat frame 130 to a seat back frame 160. Back frame 160 comprises a pair of side supports 164A and 164B. A lower end of the pair of side supports 164A and 164B are connected by a lower beam 166 (e.g., at J7-1 and J7-2), and an upper end of the pair of side supports 164A and 164B are connected by an upper beam 168 (per hidden detail of FIGS. 1A and 1B). Accordingly, the back frame 160 is rectangular, or substantially rectangular, comprising a pair of side supports 164A and 164B, lower beam 166, and upper beam 168.

Angle of tilt/incline of back frame 160 relative to the seat frame 130 can be controlled by a recliner motor 170 connected to side support 164B. The recliner motor 170 can be connected to a cog/gear surface (e.g., gear 171, per FIG. 5A), such that operation of recliner motor 170 causes the side support 164B (and support 164A) to rotate about the lower beam 166 in a forward direction to lower back frame 160, and in a reverse direction to raise back frame 160 (per FIGS. 1A-1F). Seat back frame 160 can further include a back surface 169 (e.g., per FIG. 1E), wherein, per the various embodiments presented herein, the seat back frame 160 can be tilted/positioned such that the back surface 169 is positioned to enable ingress/egress of an area behind the seat 100 (e.g., when the entry button 104 has been selected), but also the back surface 169 can be positioned such that the back surface 169 is in a same plane of a floor 198 of a cargo bay of a vehicle 101 (e.g., per FIG. 1E) when seat 100 is in the final configuration of a flat fold configuration, per selection of flat fold button 105.

As shown in FIGS. 1A-F, head rest 190 can be attached to the upper end at joint J8-1 of the back frame 160. In an embodiment, as the back frame 160 is tilted back and forth, the head rest 190 can also be tilted by any suitable means about joint J8-1, e.g., head rest 190 is spring loaded, head rest 190 is attached by a motor 195, and suchlike. As shown in FIGS. 1B and IF, when the entry button 104 is selected, the head rest 190 can remain substantially in the same position/angle relative to the back frame 160. In another embodiment, as shown in FIGS. 1B-1E, when the flat fold mode is selected (e.g., via flat fold button 105), the head rest 190 can be positioned such that is it effectively at 90°/right angle to the plane of the back surface 169, and is folded away to prevent the head rest 190 from interfering with loading of the cargo bay 198. Tilting of head rest 190 can be coordinated with the tilting of seat back 160, e.g., based on seat back 160 positioned at a defined angle of t°.

As mentioned, positional operation of seat 100 can be controlled by selection of respective buttons, entry button 104 and flat fold button 105. In an embodiment, buttons 104 and 105 can be standalone buttons located on, for example, an interior of vehicle 101, e.g., on a door frame, in a door, in the cargo area. In another embodiment, buttons 104 and 105 can be included in an HMI (e.g., an infotainment display located on a dashboard of vehicle 101, HMI 107, and suchlike) connected to SCC 103, whereby the HMI is communicatively coupled to/included in the OCS 102.

Per the foregoing, relative motion of the seat base, seat frame (e.g., basal planes BP1 and BP2), back rest, and/or head rest is in, or rotatably through, the x and y directions. The respective linkages/joints JX-X, limit motion/rotation in the z direction.

FIGS. 1A-1F illustrate respective locations/positions of various components during respective operation of the seat 100. As shown, operation of tilt motor 140 causes the position sliders 141A and 141B to move back and forth along the respective rods 138A/B. As operation of tilt motor 140 causes gear housings/sliders 141A and 141B to move to a rearward position, Pr, linkage between a lower basal plane BP1 and an upper basal plane BP2 (as further described) via tilt beams 142A/B, while rotationally pinned/pivoting at joints J3-1/2, J4-1/2, J5-1/2, and J6-1/2 causes the seat cushion frames 146A/B to move rearward and tilt backwards/upwards. As operation of tilt motor 140 causes gear housing/sliders 141A and 141B move to a forward position, Pf, linkage between the lower basal plane BP1 and upper basal plane BP2 via tilt beams 142A/B causes the seat subframes 146A/B to move forward and tilt forwards/downward. With the positioning rods 138A/B effectively remaining fixed relative to the variable position of the tilt motor 140, as the tilt motor 140 is engaged, motion of the gear 139A and 139B, the tilt motor 140 moves along the positioning rods 138A/B, causing the position sliders 141A and 141B to move relative to motion of the tilt motor 140, and accordingly, the tilt beams 142A/B.

FIGS. 2A-C, schematics 200A-C, illustrate the respective positions of the various components in the seat frame as the seat configuration changes during operation of the seat from an initial condition to a final/collapsed configuration, in accordance with one or more embodiments.

As shown in FIGS. 2A-C, with tilt beams 142A and 142B being of fixed length L, as position slider 141A/141B moves along the rod 138A/138B, from the rear position Pr to the forward position Pf, motion of the respective tilt beam 142A/142B causes:

(a) a force Ff to be applied to the recliner bracket 150A/150B, causing the recliner bracket 150A/150B to be pulled forward, (b) the front linkage 148A/148B is also caused to move forward given the front linkage 148A/148B is respectively anchored at joint J3-1 and J3-2, the front linkage 148A/148B is respectively caused to pivot downwards about the joint J3-1 and J3-2, such that the respective cushion subframe 146A/146B is caused to move forward and down towards front beam 134.

As further shown, as a function of the slider 141A/B being moved along the position rod 138A/138B, from Pr to Pf, the height Hx of the seat frame 130 changes. With the initial seat condition, per FIG. 2A, a separation distance between the seat subframe 146A/146B and the front beam 134 is H1. With the seat 100 in a mid-tilt/mid-fold position, per FIG. 2B, the separation distance between the seat subframe 146A/146B and the front beam 134 is H2. With the seat 100 in a full-fold/full-tilt position, per FIGS. 2C and 1E, the separation distance between the seat subframe 146A/146B and the front beam 134 is H3. Accordingly, by virtue of the slider 141A/141B moving along the rod 138A/138B having fixed ends at 134-1 and 136-1, and 134-2 and 136-2 in a first basal plane BP1, the shape of the quadrilateral formed by the respective edges 138A/B, 148A/B, 146A/B, and 150A/B, changes shape owing to the movement of the slider 141A/141B and tilt linkage 142A/142B, as shown in the respective quadrilaterals presented in FIGS. 2A-C and FIGS. 3A-C, such that Q1 is an initial configuration of seat 100, Q2 is a mid-tilt configuration of seat 100, and Q3 is an final flat-fold configuration). Components in basal planes BP1 and BP2 are further described in FIGS. 3A-C and 6.

As further described and shown in FIGS. 2A-2C, the relative angle Bx of the seat buckle 196 changes through configurations Q1-Q3, wherein Q1 has the largest angle Bx, and Q3 has the smallest angle for Bx.

FIGS. 3A-C, schematics 300A-300C, illustrate the respective quadrilateral shapes Q1-Q3 (e.g., as kinematic structures, in direction T) of the seat frame as function of the seat configuration, per the position of the slider/tilt beam, from an initial condition Q1 through to a final/collapsed configuration Q3, in accordance with one or more embodiments. The schematics for Q1, Q2, and Q3, correspond to the quadrilaterals Q1, Q2, and Q3 presented in FIGS. 2A-C, however, the respective edges (equating to components) and joints/connectors are identified. Basal planes BP1 and BP2 are shown in FIGS. 3A-C. BP1 comprises front beam 134, rear beam 136, and positioning rods 138A and 138B. BP2 comprises front/first frame bar 143, second/rear frame bar 144, and cushion subframes 146A and 146B. BP1 and BP2 are parallel or substantially parallel.

Edge 138A (e.g., first positioning rod 138A) connects at joint J3-1 with edge 148A (e.g., first front linkage 148A). Edge 148A connects with edge 146A (e.g., first seat cushion subframe 146A) at joint J4-1. Edge 146A connects with edge 150A (e.g., recliner bracket 150A) via joint J2-1. Edge 150A connects with edge 138A (e.g., the positioning rod 138A) at joint J5-1. Further, edge 142A (e.g., tilt beam 142A) connects to edge 146A/edge 150A and edge 138A via joint J1-1. As mentioned, joint J1-1 represents the connection and position of slider 141A to position rod 138A, with joint J1-1 moving back and forth along the positioning rod 138A, between positions Pf and Pr, in accordance with whether seat 100 is being placed in a full flat configuration or an entry/exit configuration, and further returning to the initial condition (e.g., joint J1-1 returns to position Pr) as shown in FIG. 1A/1B. Owing to the nature in which the recliner bracket 150A is connected to both joint J5-1, joint J6-1, and joint J4-1, joint J6-1 can be considered to be directly connected to joint J4-1, as indicated by the broken line 310 in FIGS. 3A-3C.

Joints J1-1, J2-1, J3-1, J4-1, J5-1, and/or J6-1 can be pin joints. Joints J3-1 and J5-1 being location-fixed pin joints, such that the distance between joints J3-1 and J5-1 remains of a fixed length regardless of the position of the slider 141A/joint J1-1. Joint J1-1 can be considered a sliding rotation joint as the position of the slider 141A moves back and forth along the positioning rod 138A. As respectively shown in the representations Q1-Q3, with tilt beam 142A being of a fixed length, and all of the respective components presented in FIGS. 3A-C being rotationally pinned at joints J2-1, J3-1, J4-1, J5-1, and/or J6-1, displacement of joint J1-1 along the positioning rod 138A introduces a displacement force Ff/Fr into the respective kinematic structures presented in FIGS. 3A-C, with a corresponding/associated change in configuration of the presented shapes/configurations. Joints J7-1 and J8-1 can be rotational joints. Joints J9-1/2 and J10-1/2, as described later, can also be pin joints.

As shown in FIGS. 3A-C, as a function of the slider 141A/B being moved along the position rod 138A/138B, from Pr to Pf, the height H of the seat frame 130 changes. With the initial seat condition, per FIG. 3A, the distance between the seat subframe 146A/146B is H1, reducing to H2 in FIG. 3B, and further reducing to H3 in FIG. 3C.

Figures 4A, 4B, 4C:
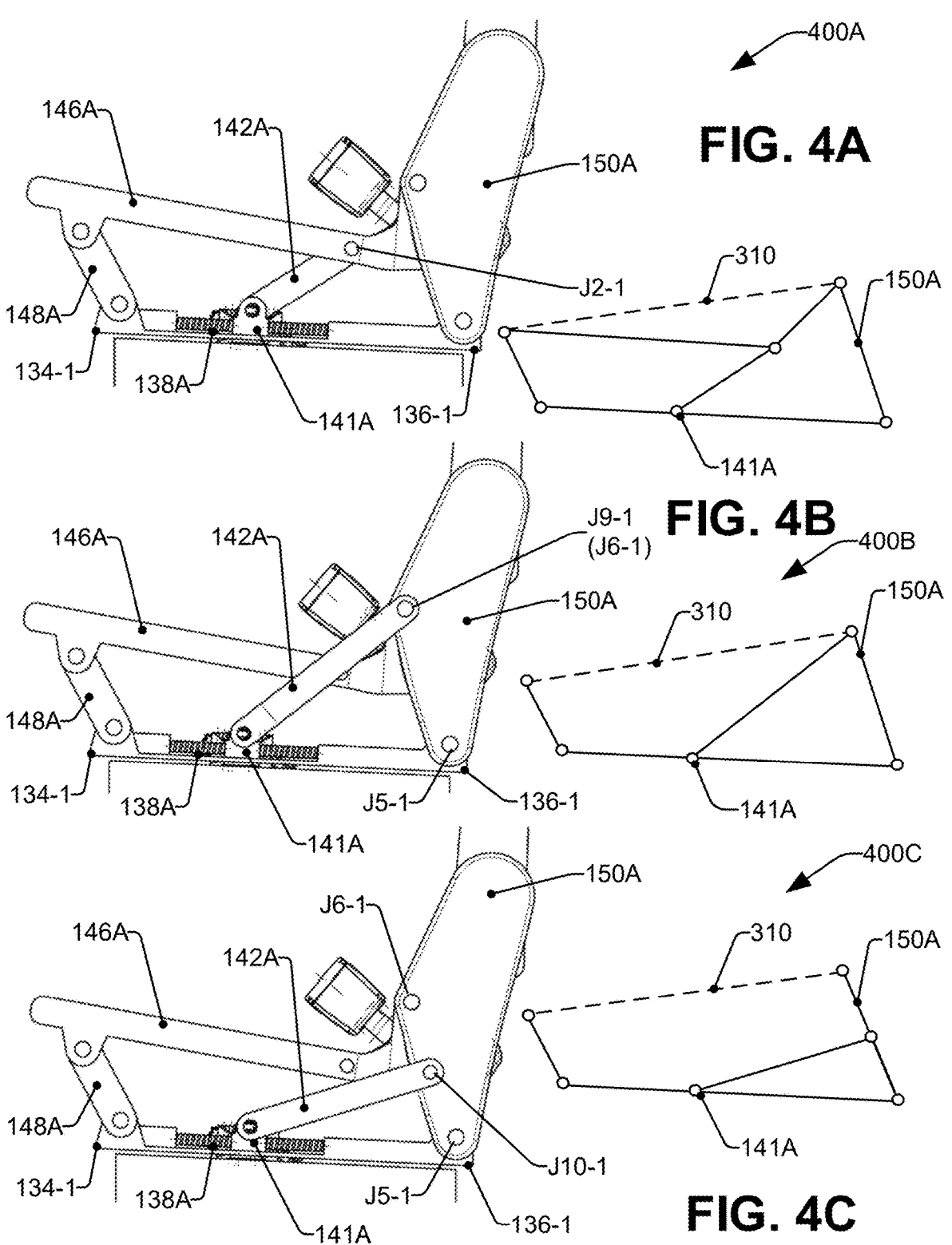
FIGS. 4A-C illustrate differing connection points for a tilt beam relative to a recliner bracket, in accordance with one or more embodiments.

FIGS. 4A-C, schematics 400A-C, illustrate differing connection points for a tilt beam relative to a recliner bracket, in accordance with one or more embodiments.

FIG. 4A illustrates the second end J2-1 of tilt beam 142A being connected to the first cushion subframe 146A at joint J2-1.

FIG. 4B illustrates the second end J2-1 of tilt beam 142A being connected to the recliner bracket 150A at joint J9-1, wherein joint J9-1 is located between the joint J5-1 and joint J7-1, such that joint J9-1 is located at the joint J6-1.

FIG. 4C illustrates the second end J2-1 of tilt beam 142A being connected to the recliner bracket 150A at joint J10-1, wherein joint J10-1 is located between joints J5-1 and J6-1.

As shown in the accompanying wire frame diagrams, movement of joint J1-1 along the positioning rod 138A will still cause the creation of forces Ff and Fr, such that edges 150A and 148A will both flatten with the forward motion of slider 141A, per each of the configurations presented in FIGS. 4A-4C.

FIGS. 5A and 5B present schematics 500A-B illustrating location of a seatbelt buckle during collapsing/reclining of a seat, in accordance with one or more embodiments.

Per FIG. 5A, a slot 510 is fabricated in the second seat cushion subframe 146B, with a seatbelt buckle 196 attached to the subframe 146B via pin 520, whereby pin 520 moves within slot 510. Per the sequence represented in FIGS. 5A and 5B, as the seat back 160 is lowered towards the seat frame 130, the seatbelt buckle 196 is caused to lower towards the seat frame 130, thereby causing the seatbelt buckle 196 to be positioned lower than the back surface 169 when the seat 100 is in a flat fold configuration (e.g., per FIG. 1E). With the seatbelt buckle 196 "hidden" away, the seatbelt buckle 196 does not interfere with the seat back 160 when folded flat, e.g., during loading of the cargo bay floor 198.

The various structures, linkages, beams, bars, etc., described herein can be formed from any suitable material having a desired strength to weight ratio, e.g., aluminum, aluminum alloy, titanium, carbon fiber, fiber glass, polymer, steel, pressed metal, cast metal, forged metal, and the like. The various bushings (e.g., at joints Jx-x) can be formed from any suitable material, e.g., polymer, metal, ceramic, etc. The respective connections and fittings can be manu-factured from any suitable material, e.g., metal screws, polymer screws, metal washers, polymer washers, metal fasteners, polymer fasteners, and the like.

Any suitable motor can be respectively utilized for motors 120, 140, 170, and 195, such as an electric motor, a servo motor, a stepper motor, and suchlike. Motors 120, 140, 170, and 195, can include a position encoder to facilitate adjust-ment of the position of seat 100 as required. For example, during the initial flat fold operation (per FIGS. 1A-1E) the recline motor 170 can be initially engaged to cause the seat back frame 160 to tilt forwards, and once a defined angle t° of the seat back frame 160 relative to the seat frame 130 has been achieved, the tilt motor 140 can also be engaged, enabling the thickness (H) of the seat frame 130 to reduce, further enabling recline motor 170 to further tilt seat back frame 160 further forwards. Any desired angle t° of incline of the seat back frame 160 can be utilized to initiate operation of the tilt motor 140. For example, when a tilt angle t of 67° of seat back frame 160 is achieved/detected (e.g., by position encoder in motor 170 or seat controller 103) during operation of the recline motor 170, the tilt motor 140 is also engaged to move/reposition the tilt beams 142A and 142B to move from position Pr to Pf. The tilt angle t° is arbitrary and any suitable value for the tilt angle can be used with the various embodiments presented herein.

OCS 102 can include a processor (not shown) and a memory (not shown), wherein the processor can execute the various computer-executable components, functions, opera-tions, etc., presented herein, regarding operation of motors 120, 140, 170, and 195. The memory can be utilized to store the various computer-executable components, functions, code, etc., as well as tilt settings t°, and such. Settings for the respective entry/exit mode and full flat mode can be respec-tively stored in configurations 108 and 109. In an embodi-ment, configurations 108 and 109 can include defined posi-tions for Pr and Pf, e.g., as defined during manufacturing and/or operation of vehicle 101. In another embodiment, positions Pr and Pf can simply be the length of grooved portions of grooved positioning rods 138A/B, whereby, a first position where the rod 138A/B changes from a grooved to non-grooved portion forms a hard stop Pr for slider 141A/B, and a second position where the rod 138A/B changes from a grooved to non-grooved portion forms a hard stop Pf for slider 141A/B.

In an embodiment, the OCS 102 can further include a human-machine interface (HMI) 107 (e.g., a display, a graphical-user interface (GUI)) which can be configured to present/receive various information regarding positioning of seat 100, and such, per the various embodiments presented herein. The HMI 107 can include an interactive display (not shown) to present/receive the various information via vari-ous screens presented thereon, and further configured to facilitate input of information/settings/etc., regarding opera-tion of seat 100.

Methods

FIG. 6, via flowchart 600, illustrates a method for con-structing and utilizing a seat, in accordance with one or more embodiments. As previously described, the seat structure can be configured to be in a position to enable entry/exit of a location of a vehicle (e.g., in response to entry button 104 being selected), enable extension of a cargo bay of a vehicle (e.g., in response to fold flat button 105 being selected), and suchlike. Positioning of the respective portions of the seat structure can be enabled through manual interaction with the seat, or via one or more motors incorporated into the seat structure.

At 610, a seat cushion portion (e.g., seat cushion portion 130) is fabricated. The seat cushion portion comprises a three dimensional configuration comprising:

i. a first/lower basal plane (e.g., BP1) comprising:
   a front beam (e.g., front beam 134),
   a rear beam (e.g., rear beam 136),
   a pair of positioning rods (e.g., positioning rods 138A and 138B), wherein, the first positioning rod (e.g., positioning rod 138A) connecting a first end (e.g., joint J3-1) of the front beam to a first end (e.g., joint J5-1) of the rear beam, and
   the second positioning rod (e.g., positioning rod 138B) connecting a second end (e.g., joint J3-2) of the front beam to a second end (e.g., joint J5-2) of the rear beam.

ii. a second/upper basal plane (e.g., BP2) located above the lower basal plane, the upper basal plane compris-ing:
   a first connecting bar (e.g., front frame bar 143);
   a second connecting bar (e.g., second frame bar 144);
   a pair of cushion subframes 146A and 146B, wherein the first cushion subframe (e.g., cushion subframe 146A) connecting a first end (e.g., joint J4-1) of the first connecting bar to a first end (e.g., joint J6-1) of the second connecting bar, and the second cushion subframe (e.g., cushion subframe 146B) connecting a second end (e.g., joint J4-2) of the first connecting bar to a second end (e.g., joint J6-2) of the second connecting bar.

The Upper Basal Plane and the Lower Basal Plane are Connected Via:

a pair of front linkages (e.g., front linkages 148A and 148B), wherein the first front linkage (e.g., first front linkage 148A) connects the lower basal plane at joint J3-1 with the upper basal plane at joint J4-1, the second front linkage (e.g., second front linkage 148B) connects the lower basal plane at joint J3-2 with the upper basal plane at joint J4-2, and a pair of recliner brackets (e.g., recliner brackets 150A and 150B), wherein the first recliner bracket (e.g., first recliner bracket 150A) connects the lower basal plane at J5-1 with the upper basal plane at joint J6-1, and the second recliner bracket (e.g., second recliner bracket 150B) connects the lower basal plane at J5-2 with the upper basal plane at joint J6-2.

At 620, a pair of tilt beams (e.g., tilt beams 142A and 142B) are further connected to the seat cushion portion, wherein:

a first end (e.g., joint J1-1) of the first tilt beam (e.g., tilt beam 142A) is connected to first position rod (e.g., rod 138A) by a first slider (e.g., position slider 141A) and a second end (e.g., joint J2-1) of the first tilt beam is connected to the first cushion subframe (e.g., subframe 146A) between joints J4-1 and J6-1; and a second end (e.g., joint J1-2) of the second tilt beam (e.g., tilt beam 142B) is connected to second position rod (e.g., rod 138B) by a second slider (e.g., position slider 141B) and a second end (e.g., joint J2-2) of the second tilt beam is connected to the second cushion subframe (e.g., subframe 146B) between joints J4-2 and J6-2.

At 630, a tilt motor (e.g., tilt motor 140) is connected to the first slider via a first drive shaft (e.g., drive shaft 137A) and to the second slider via a second drive shaft (e.g., drive shaft 137B).

At 640, the tilt motor is turned on, wherein combined forward motion of the first slider along the first position bar and the second slider along the second position bar causes the upper basal plane to move laterally forward relative to the lower basal plane. Also, combined rearward motion of the first slider along the first position bar and the second slider along the second position bar causes the upper basal plane to move laterally rearward/backward relative to the lower basal plane. Owing to the respective pinned joints forming the four corner edges of the seat frame, during forward motion of the upper basal plane, the height of the upper basal plane relative to the lower basal plane is caused to reduce (e.g., H1→H2→H3), and during rearward motion of the upper basal plane, the height of the upper basal plane relative to the lower basal plane is caused to increase (e.g., H3→H2→H1).

FIG. 7, via flowchart 700, illustrates a method for constructing and utilizing a seat, in accordance with one or more embodiments. As previously described, the seat structure can be configured to be in a position to enable entry/exit of a location of a vehicle (e.g., in response to entry button 104 being selected), enable extension of a cargo bay of a vehicle (e.g., in response to fold flat button 105 being selected), and suchlike. Positioning of the respective portions of the seat structure can be enabled through manual interaction with the seat, or via one or more motors incorporated into the seat structure.

At 710, a seat base (e.g., seat base 110) is located on a floor (e.g., floor 116) of a vehicle (e.g., vehicle 101), wherein the floor can be located in a passenger compartment of the vehicle.

At 720, a seat frame (e.g., seat frame 130) is fixably attached to the seat base. As previously described, a tilt motor (e.g., tilt motor 140) can be included in the seat frame, whereby operation of the tilt motor causes the height/thickness of the seat frame to be adjusted.

At 730, a seat back (e.g., seat back 160) can be fixable attached to an end (e.g., at joints J5-1) of the seat frame, whereby the seat back can rotationally positioned relative to the position of the seat back. The seat back can include a recline motor (e.g., recline motor 170) configured to rotationally position the seat back relative to the seat frame (e.g., upper basal plane BP2, per FIGS. 1A and 3A-C).

At 740, a head rest (e.g., head rest 190) can be attached to the uppermost end of the seat back. A head rest tilt motor (e.g., head rest tilt motor 195) can be incorporated into the seat back to facilitate tilting of the head rest during positioning of the seat back in the entry/exit configuration or the full fold configuration. Alternatively, tilting of the head rest can be achieved by use of springs (e.g., being extended as the seat back is tilted).

Figure 8:
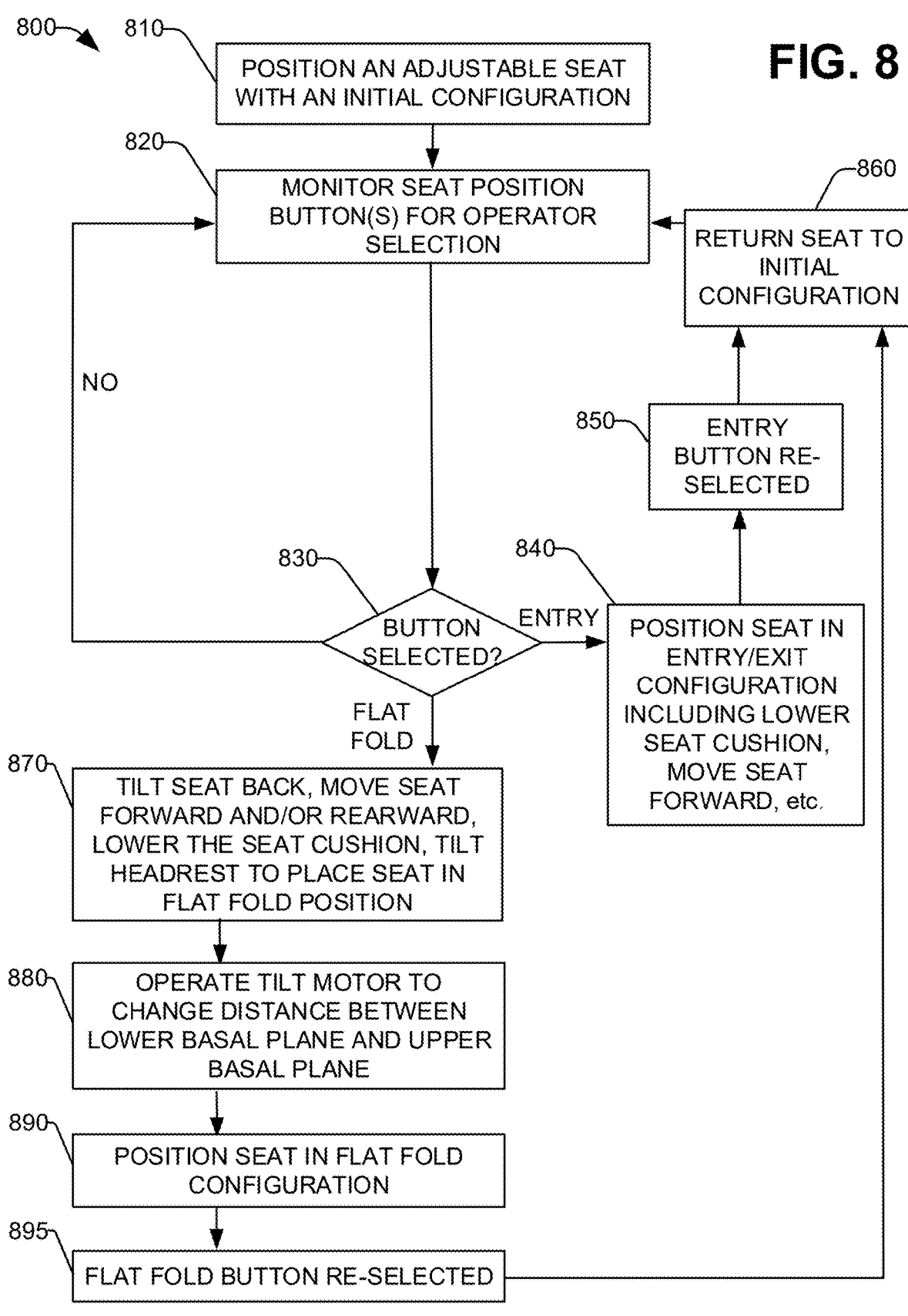
FIG. 8 is a flowchart presenting a method for adjusting configuration of a seat, in accordance with one or more embodiments.

FIG. 8, via flowchart 800, illustrates a method for adjusting configuration of a seat, in accordance with one or more embodiments.

At 810, a seat (e.g., seat 100) can be positioned with an initial configuration (e.g., per FIGS. 1A and 1B), whereby a seat back (e.g., seat back frame 160) is positioned with a substantially vertical configuration.

At 820, one or more control buttons (e.g., entry button 104, flat fold button 105) are monitored (e.g., by seat controller 103), wherein the one or more buttons control configuration/positioning of the seat.

At 830, in response to a determination (e.g., by seat controller 103) that a button has still to be selected, method 800 can return to 820 to maintain monitoring of button selection.

At 830, in response to a determination (e.g., by seat controller 103) that the entry button was selected, method 800 can advance to step 840, whereupon operation of a first motor (e.g., tilt motor 140) can be initiated causing the seat frame to compress. A second motor (e.g., base motor 120) can also initiate to move the seat base (e.g., seat base 110) forward in floor guides (e.g., guide rails 114A and 114B). A third motor (e.g., recline motor 170) can also be initiated to adjust position/tilt angle of the seat back. A fourth motor (e.g., motor 195) can be initiated to tilt a head rest (e.g., head rest 190) attached to the seat back. Sequence of operating the first motor, second motor, third motor, and/or fourth motor can be in any sequence/combination to facilitate positioning the seat in the entry/exit position (e.g., per FIG. 1F). Method 800 can further advance to step 850, whereupon the seat can be held in the entry position (e.g., operation of motors 120, 140, 170, and/or 195 is temporarily terminated) until a determination (e.g., by seat controller 103) that the entry button has been re-selected, whereupon the respective motors can operate to return the seat to the initial position. Re-selection of the entry button can be performed, for example, once the occupant has entered or exited the vehicle, causing the various previously described operations to be performed in reverse to return the seat to the initial configuration. Method 800 can return to 820 for monitoring of the next button selection.

At 830, in response to a determination (e.g., by seat controller 103) that the flat fold button was selected, method

800 can advance to step 870. At 870, operation of a first motor (e.g., tilt motor 140) can be initiated causing the seat back to move forwards. A second motor (e.g., base motor 120) can also initiate any of (a) move the seat base (e.g., seat base 110) forward in floor guides (e.g., guide rails 114A and 114B), (b) move the seat base rearward to enable clearance between the seat and another seat located in front of the seat on which the second motor is located, (c) move the seat base rearward to enable the back (e.g., seat back surface 169) of the seat to meet up with a cargo bay floor (e.g., cargo bay floor 198, (d) any combination of the foregoing, (e) and suchlike. A third motor (e.g., recline motor 170) can also be initiated to adjust position/tilt angle of the seat back. A fourth motor (e.g., motor 195) can be initiated to tilt a head rest (e.g., head rest 190) attached to the seat back. Sequence of operating the first motor, second motor, third motor, and/or fourth motor can be in any sequence/combination to facilitate positioning the seat in the full fold position (e.g., per FIGS. 1A-1E). For example, operation of the first motor does not initiate until operation of the third motor positions the seat back at a defined angle (e.g., angle $t°$).

At 880, as previously described, operation of the first motor can be configured to cause a separation distance to reduce between the first basal plane (BP1) and second basal plane (BP2) of the seat frame (e.g., seat frame 130), adjusting height of a seat cushion, as previously described.

At 890, with the seat positioned in the flat fold configuration (e.g., seat back frame is in a substantially horizontal position, seat frame is compressed, head rest is folded down) operation of the first motor, second motor, third motor, fourth motor, etc., can be terminated, e.g., to enable the cargo bay to be loaded.

At 895, upon reselection of the flat fold button, method 800 can advance to step 860, whereupon, any of the first motor, second motor, third motor, and/or fourth motor, can be re-initiated, with the flat fold operations reversed to return the seat to an initial configuration.

FIG. 9, Chart

Figures 9A, 9B:
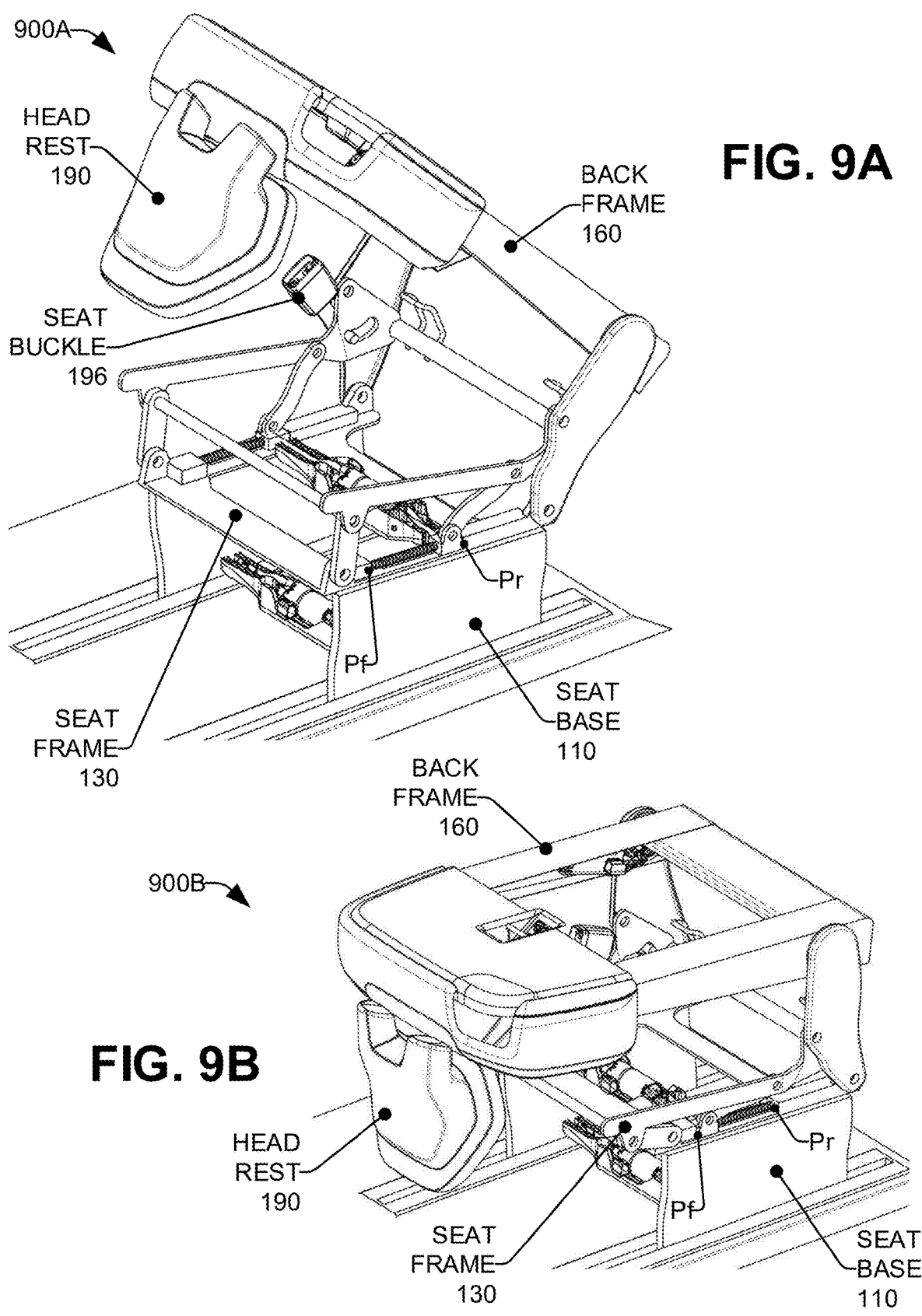
FIGS. 9A and 9B are isometric views of a seat undergoing adjustment to a full fold configuration, in accordance with an embodiment.

FIGS. 9A and 9B, schematics 900A and 900B, illustrate a seat undergoing adjustment to a full fold configuration, in accordance with an embodiment. FIG. 9A is an isometric view of FIG. 1D of seat 100 nearing final fold configuration. FIG. 9B is an isometric view of FIG. 1E of seat 100 in a final fold configuration.

Figure 10:
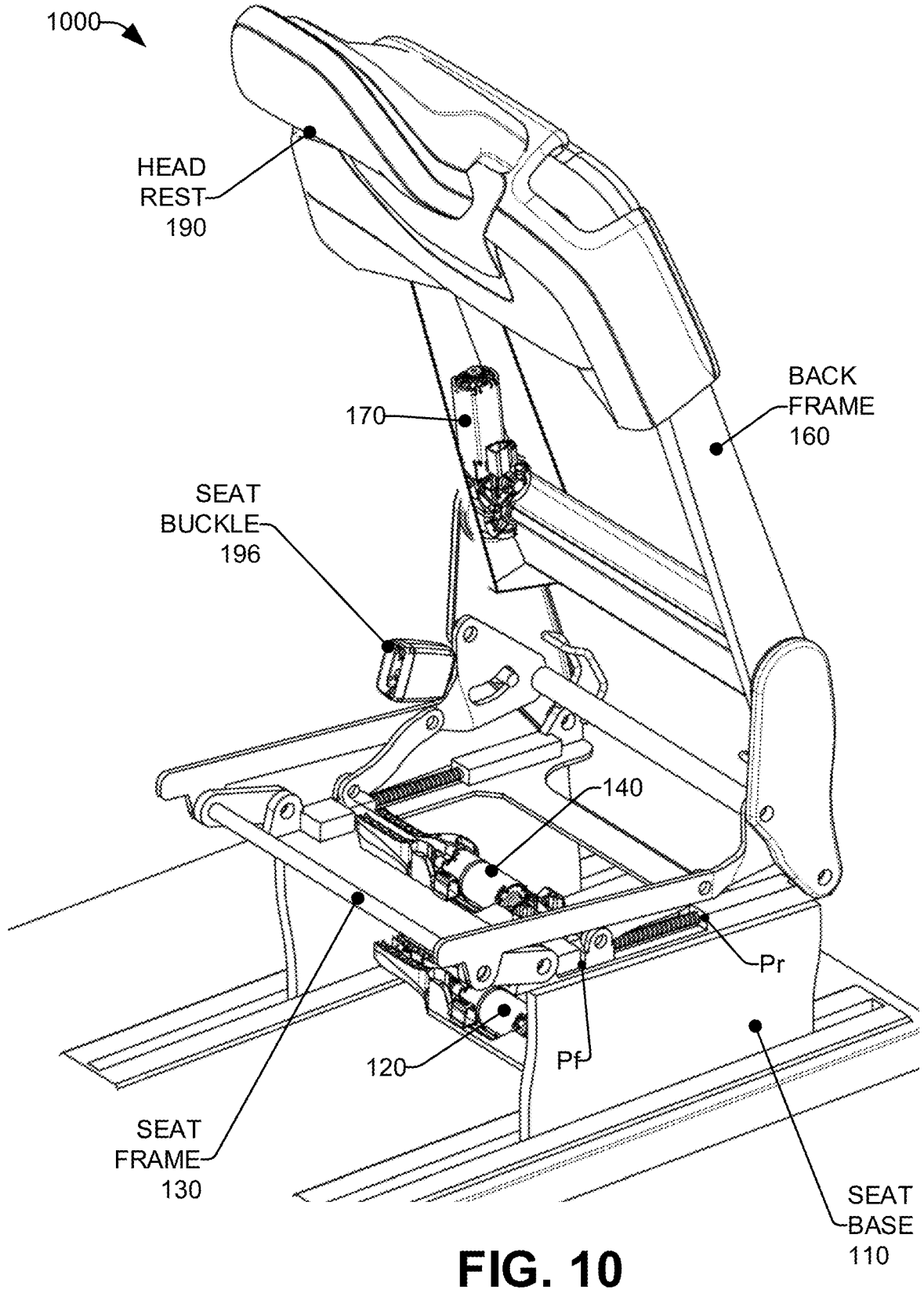
FIG. 10 is an isometric view of a seat undergoing adjustment to an entry/exit configuration, in accordance with an embodiment.

FIG. 10, schematic 1000, illustrates a seat undergoing adjustment to an entry/exit configuration, in accordance with an embodiment. FIG. 10, schematic 1000, is an isometric view of FIG. IF of seat 100 in an entry/exit configuration.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Various non-limiting aspects of various embodiments described herein are presented in the following clauses.

Clause 1. An adjustable seat, comprising: a first set of components arranged in a first plane located in a seat frame; a second set of components arranged in a second plane located in the seat frame, wherein the second plane is parallel, or substantially parallel, to the first plane, and the second plane is separated from the first plane by a first separation distance; a tilt beam connecting the first set of components to the second set of components; and a tilt motor connected to the tilt beam, wherein operation of the tilt motor causes the tilt beam to change position, wherein a change in position of the tilt beam results in the second plane being separated from the first plane by a second separation distance.

Clause 2. The system of any preceding clause, wherein the second separation distance is less than the first separation distance.

Clause 3. The system of any preceding clause, wherein the seat frame is connected to a reclinable back rest.

Clause 4. The system of any preceding clause, wherein the seat is attached to a floor, and with the seat having the second separation distance, the back rest is reclined to a position such that the back rest is substantially parallel to the floor.

Clause 5. The system of any preceding clause, further comprising: a positioning rod having a grooved surface, wherein the positioning rod is included in the first set of components; a positioning gear configured to mesh with the grooved surface; a movable slider configured to house the positioning gear; and a drive shaft connecting the tilt motor to the gear.

Clause 6. The system of any preceding clause, wherein a first end of the tilt beam connects with the first set of components, connection is via a first joint; and a second end of the tilt beam connects with the second set of components, connection is via a second joint.

Clause 7. The system of any preceding clause, wherein movement of the tilt beam in a first direction along the positioning rod causes a reduction in the separation distance between the first plane and the second plane, and movement of the tilt beam in a second direction along the positioning rod causes an increase in the separation distance between the first plane and the second plane.

Clause 8. The system of any preceding clause, further comprising a pair of front linkages connecting the first set of components to the second set of components, and a pair of rear linkages connecting the first set of components to the second set of components, wherein the pair of front linkages and pair of rear linkages constrain movement of the first plane relative to the second plane in the x and y axes.

Clause 9. The system of any preceding clause, wherein the tilt beam is located between a first front linkage in the pair of front linkages and a first rear linkage in the pair of rear linkages.

Clause 10. The system of any preceding clause, wherein: the first set of components comprise a front beam, a rear beam, a pair of positioning rods; and the second set of components comprise a first frame bar, a second frame bar, and a pair of cushion subframes.

Clause 11. The system of any preceding clause, wherein the adjustable seat is located onboard a vehicle.

Clause 12. A method, comprising: operating a tilt motor to move a geared slider in a first direction along a grooved rod, wherein the geared slider is connected to a first end of a tilt beam, the second end of the tilt beam is connected to a subframe, wherein the grooved rod is included in a first set of components located in a seat structure defined by a first basal plane and the subframe is included in a second set of components located in the seat structure defined by a second basal plane, wherein the first basal plane and the second basal plane are parallel, or substantially parallel, and wherein, motion of the geared slider in a first direction along the grooved rod causes a separation distance between the first basal plane and the second basal plane to decrease.

Clause 13. The method of any preceding clause, wherein the seat structure is located onboard a vehicle and operation of the tilt motor is initiated in response to selection of a button located onboard the vehicle.

Clause 14. The method of any preceding clause, wherein the geared slider, the first set of components, and the second set of components form a kinematic lattice, wherein motion of the kinematic lattice is confined to the lateral and vertical directions.

Clause 15. The method of any preceding clause, wherein a back rest is attached to the kinematic lattice, with the slider moving in the first direction, the back rest is tilted by a recline motor, such that the back rest is rotated to a flat fold position.

Clause 16. The method of any preceding clause, wherein the back rest includes a back surface, and when the back rest is in the flat fold position, the back surface is aligned with a surface of a cargo back located onboard the vehicle.

Clause 17. The method of any preceding clause, wherein a head rest is attached to the back rest, and when the back rest is in the flat fold position, the head rest is aligned vertically with respect to a horizontal alignment of the back rest.

Clause 18. The method of any preceding clause, wherein re-selection of the button causes the tilt motor to reverse direction, returning the first set of components located to an initial position relative to the position of the second set of components located in the seat structure.

Clause 19. A seat system, comprising: a seat cushion frame comprising: a kinematic structure, wherein the kinematic structure is located between and connects a seat base to a seat back, the seat cushion frame comprises a first set of components forming a lower basal plane and a second set of components forming an upper basal plane, wherein the lower basal plane and the upper basal plane are parallel, or substantially parallel; a first tilt beam configured to connect the lower basal plane with the upper basal plane; and a tilt motor configured to adjust position of the first tilt beam from a first position to a second position, wherein the first position of the first tilt beam creates a first separation distance between the upper basal plane and the lower basal plane, and the second position of the first tilt beam creates a second separation distance between the upper basal plane and the lower basal plane, wherein the first separation distance is greater than the second separation distance.

Clause 20. The seat system of any preceding clause, further comprising: a second tilt beam paired with the first tilt beam, wherein the second tilt beam is configured to connect the lower basal plane with the upper basal plane and operate in parallel with the first tilt beam; and the tilt motor is configured to adjust position of the second tilt beam from a third position to a fourth position, wherein the third position of the second tilt beam is aligned parallel to an alignment of the first tilt beam when in the first position, and the fourth position of the second tilt beam is aligned parallel to an alignment of the first tilt beam when in the second position.

In various cases, any suitable combination of clauses 1-11 can be implemented.

In various cases, any suitable combination of clauses 12-18 can be implemented.

In various cases, any suitable combination of clauses 19-20 can be implemented.

What is claimed is:

1. An adjustable seat onboard a vehicle, comprising:
a first set of components arranged in a first plane located in a seat frame;
a second set of components arranged in a second plane located in the seat frame, wherein the second plane is parallel, or substantially parallel, to the first plane, and the second plane is separated from the first plane by a first separation distance;
a tilt beam connecting the first set of components to the second set of components; and
a tilt motor connected to the tilt beam, wherein operation of the tilt motor causes the tilt beam to change position in a first direction, wherein the change in position in the first direction of the tilt beam results in the second plane being separated from the first plane by a second separation distance that is less than the first separation distance, wherein the operation of the tilt motor to change the position in the first direction of the tilt beam is initiated in response to selection of a button located onboard the vehicle, and wherein re-selection of the button causes the tilt motor to reverse direction, returning the first set of components located to an initial position relative to a position of the second set of components located prior to the change in position in the first direction of the tilt beam.

2. The adjustable seat of claim 1, further comprising:
a positioning rod having a grooved surface, wherein the positioning rod is included in the first set of components;
a positioning gear configured to mesh with the grooved surface;
a movable slider configured to house the positioning gear; and
a drive shaft connecting the tilt motor to the positioning gear.

3. The adjustable seat of claim 2, wherein:
a first end of the tilt beam connects with the first set of components, connection is via a first joint; and
a second end of the tilt beam connects with the second set of components, connection is via a second joint.

4. The adjustable seat of claim 3, wherein movement of the tilt beam in the first direction along the positioning rod causes a reduction in a separation distance between the first plane and the second plane, and movement of the tilt beam in a second direction along the positioning rod causes an increase in the separation distance between the first plane and the second plane.

5. The adjustable seat of claim 1, further comprising a pair of front linkages connecting the first set of components to the second set of components, and a pair of rear linkages connecting the first set of components to the second set of components, wherein the pair of front linkages and pair of rear linkages constrain movement of the first plane relative to the second plane in x and y axes.

6. The adjustable seat of claim 5, wherein the tilt beam is located between a first front linkage in the pair of front linkages and a first rear linkage in the pair of rear linkages.

7. The adjustable seat of claim 1, wherein:
the first set of components comprise a front beam, a rear beam, a pair of positioning rods; and
the second set of components comprise a first frame bar, a second frame bar, and a pair of cushion subframes.

8. The adjustable seat of claim 1, wherein the seat frame is connected to a reclinable back rest.

9. The adjustable seat of claim 8, wherein the adjustable seat is attached to a floor of the vehicle, and with the adjustable seat having the second separation distance, the reclinable back rest is reclined to a position such that the reclinable back rest is substantially parallel to the floor.

10. A method, comprising:
operating a tilt motor to move a geared slider in a first direction along a grooved rod, wherein the geared slider is connected to a first end of a tilt beam, and second end of the tilt beam is connected to a subframe, wherein the grooved rod is included in a first set of components located in a seat structure defined by a first basal plane, and the subframe is included in a second set of components located in the seat structure defined by a second basal plane, wherein the first basal plane and the second basal plane are parallel, or substantially parallel, wherein motion of the geared slider in the first direction along the grooved rod causes a separation distance between the first basal plane and the second basal plane to decrease, wherein the seat structure is located onboard a vehicle, wherein the operation of the tilt motor to move the geared slider in the first direction is initiated in response to selection of a button located onboard the vehicle, and wherein re-selection of the button causes the tilt motor to reverse direction, returning the first set of components located to an initial position relative to a position of the second set of components located in the seat structure prior to the movement of the geared slider in the first direction.

11. The method of claim 10, wherein the geared slider, the first set of components, and the second set of components form a kinematic lattice, wherein motion of the kinematic lattice is confined to lateral and vertical directions.

12. The method of claim 11, wherein a back rest is attached to the kinematic lattice, with the geared slider moving in the first direction, the back rest is tilted by a recline motor, such that the back rest is rotated to a flat fold position.

13. The method of claim 12, wherein the back rest includes a back surface, and when the back rest is in the flat fold position, the back surface is aligned with a surface of a cargo back located onboard the vehicle.

14. The method of claim 12, wherein a head rest is attached to the back rest, and when the back rest is in the flat fold position, the head rest is aligned vertically with respect to a horizontal alignment of the back rest.

15. The method of claim 12, wherein causing the tilt motor to reverse direction, causes the recline motor to rotate the back rest to an unfolded position.

16. A seat system onboard a vehicle, comprising:
a seat cushion frame comprising:
    a kinematic structure, wherein the kinematic structure is located between and connects a seat base to a seat back, the seat cushion frame comprises a first set of components forming a lower basal plane and a second set of components forming an upper basal plane, wherein the lower basal plane and the upper basal plane are parallel, or substantially parallel;
    a first tilt beam configured to connect the lower basal plane with the upper basal plane; and
    a tilt motor configured to adjust position of the first tilt beam from a first position to a second position, wherein the first position of the first tilt beam creates a first separation distance between the upper basal plane and the lower basal plane, and the second position of the first tilt beam creates a second separation distance between the upper basal plane and the lower basal plane, wherein the first separation distance is greater than the second separation distance, wherein operation of the tilt motor to adjust the first tilt beam from the first position to the second position is initiated in response to selection of a button located onboard the vehicle, and wherein re-selection of the button causes the tilt motor to reverse direction, returning the first tilt beam from the second position to the first position and returning the upper basal plane and the lower basal plane to the first separation distance.

17. The seat system of claim 16, further comprising:
a second tilt beam paired with the first tilt beam, wherein the second tilt beam is configured to connect the lower basal plane with the upper basal plane and operate in parallel with the first tilt beam; and
the tilt motor is configured to adjust position of the second tilt beam from a third position to a fourth position, wherein the third position of the second tilt beam is aligned parallel to an alignment of the first tilt beam when in the first position, and the fourth position of the second tilt beam is aligned parallel to an alignment of the first tilt beam when in the second position.

18. The seat system of claim 16, wherein the seat back is foldable.

19. The seat system of claim 16, wherein in response to the first position of the first tilt beam creating the first separation distance between the upper basal plane and the lower basal plane causes the seat back to fold to a position such that the seat back is substantially parallel to a floor of the vehicle.

20. The seat system of claim 19, wherein in response to the second position of the first tilt beam creating the second separation distance between the upper basal plane and the lower basal plane causes the seat back to unfold to an initial position prior to the seat back being substantially parallel to the floor of the vehicle.

* * * * *